US012791956B2

(12) United States Patent
Nishimura et al.

(10) Patent No.: US 12,791,956 B2
(45) Date of Patent: Nov. 10, 2026

(54) TONER AND TWO-COMPONENT DEVELOPER

(71) Applicant: CANON KABUSHIKI KAISHA, Tokyo (JP)

(72) Inventors: Yuu Nishimura, Chiba (JP); Kentaro Kamae, Kanagawa (JP); Kenta Mitsuiki, Fukuoka (JP); Nobuhiro Yoshida, Ibaraki (JP); Maki Imura, Kanagawa (JP); Kohei Yoshiyama, Chiba (JP); Kazunari Ooyama, Ibaraki (JP); Nobuyoshi Sugahara, Tokyo (JP); Yuya Chimoto, Chiba (JP); Takaho Shibata, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 414 days.

(21) Appl. No.: 18/616,695

(22) Filed: Mar. 26, 2024

(65) Prior Publication Data

US 2024/0337960 A1 Oct. 10, 2024

(30) Foreign Application Priority Data

Apr. 6, 2023 (JP) ................................ 2023-062227

(51) Int. Cl.
*G03G 9/087* (2006.01)
*G03G 9/107* (2006.01)

(52) U.S. Cl.
CPC ......... *G03G 9/08755* (2013.01); *G03G 9/107* (2013.01)

(58) Field of Classification Search
CPC ............. G03G 9/0821; G03G 9/08782; G03G 9/08786; G03G 9/08755
See application file for complete search history.

(56) References Cited

U.S. PATENT DOCUMENTS

| | | | |
|---|---|---|---|
| 7,320,850 | B2 | 1/2008 | Itakura |
| 7,396,626 | B2 | 7/2008 | Fujikawa |
| 7,396,629 | B2 | 7/2008 | Baba |
| 7,833,687 | B2 | 11/2010 | Kato |
| 8,084,174 | B2 | 12/2011 | Hasegawa |
| 8,697,327 | B2 | 4/2014 | Shibata |
| 8,921,023 | B2 | 12/2014 | Baba |
| 8,927,188 | B2 | 1/2015 | Naka |
| 8,986,914 | B2 | 3/2015 | Fujikawa |
| 9,057,970 | B2 | 6/2015 | Ida |
| 9,058,924 | B2 | 6/2015 | Komatsu |
| 9,063,443 | B2 | 6/2015 | Ishigami |
| 9,348,247 | B2 | 5/2016 | Ida |
| 9,500,975 | B2 | 11/2016 | Sugahara |
| 9,540,483 | B2 | 1/2017 | Ida |
| 9,599,920 | B2 | 3/2017 | Sugahara |
| 9,665,023 | B2 | 5/2017 | Kamae |
| 9,696,644 | B2 | 7/2017 | Ida |
| 9,778,598 | B2 | 10/2017 | Onozaki |
| 9,785,070 | B2 | 10/2017 | Sugahara |
| 9,897,934 | B2 | 2/2018 | Tamura |
| 9,915,885 | B2 | 3/2018 | Katsumata |
| 9,958,809 | B2 | 5/2018 | Sugahara |
| 9,969,834 | B2 | 5/2018 | Ohtsu |
| 10,007,206 | B2 | 6/2018 | Sugahara |
| 10,012,918 | B2 | 7/2018 | Ishigami |
| 10,012,920 | B2 | 7/2018 | Shibata |
| 10,012,921 | B2 | 7/2018 | Kamae |
| 10,078,281 | B2 | 9/2018 | Ida |

(Continued)

FOREIGN PATENT DOCUMENTS

| | | |
|---|---|---|
| JP | 4-299357 A | 10/1992 |
| JP | 2004-46095 A | 2/2004 |

(Continued)

OTHER PUBLICATIONS

Translation of JP 2017-223854.*

(Continued)

*Primary Examiner* — Peter L Vajda
(74) *Attorney, Agent, or Firm* — VENABLE LLP

(57) ABSTRACT

A toner comprising: a toner particle comprising a binder resin, a release agent, and a graft polymer (A), wherein the binder resin comprises an amorphous polyester, the graft polymer (A) has two or more exothermic peaks measured by differential scanning calorimetric measurement, the release agent has at least one exothermic peak, and when, among exothermic peaks of the graft polymer (A), a peak temperature of a highest temperature-side exothermic peak is indicated by $T_{Max}$ (° C.), a peak temperature of a lowest temperature-side exothermic peak is indicated by $T_{Min}$ (° C.), and, among exothermic peaks of the release agent, a peak temperature of a maximum exothermic peak is indicated by $T_{Wax}$ (° C.), $T_{Max}$, $T_{Min}$ and $T_{Wax}$ satisfy relationships of formulae (1) and (2) below:

$$5.0 \leq T_{Max} - T_{Min} \leq 20.0, \text{ and} \quad (1)$$

$$10.0 \leq T_{Wax} - T_{Max} \leq 40.0. \quad (2)$$

11 Claims, No Drawings

(56) References Cited

U.S. PATENT DOCUMENTS

| | | | |
|---|---|---|---|
| 10,088,765 | B2 | 10/2018 | Miyakai |
| 10,133,201 | B2 | 11/2018 | Kamae |
| 10,203,619 | B2 | 2/2019 | Yamashita |
| 10,216,108 | B2 | 2/2019 | Iwasaki |
| 10,228,629 | B2 | 3/2019 | Tamura |
| 10,234,777 | B2 | 3/2019 | Ohtsu |
| 10,353,312 | B2 | 7/2019 | Kamae |
| 10,409,188 | B2 | 9/2019 | Sugahara |
| 10,423,090 | B2 | 9/2019 | Ohtsu |
| 10,451,990 | B2 | 10/2019 | Kamae |
| 10,514,624 | B2 | 12/2019 | Tamura |
| 10,642,178 | B2 | 5/2020 | Yamashita |
| 10,656,545 | B2 | 5/2020 | Kamae |
| 10,775,710 | B1 | 9/2020 | Kamae |
| 10,838,317 | B2 | 11/2020 | Sugahara |
| 10,859,931 | B2 | 12/2020 | Hashimoto |
| 10,859,936 | B2 | 12/2020 | Sugahara |
| 10,877,386 | B2 | 12/2020 | Murayama |
| 10,877,391 | B2 | 12/2020 | Matsuo |
| 10,969,705 | B2 | 4/2021 | Shirayama |
| 11,029,617 | B2 | 6/2021 | Chimoto |
| 11,112,711 | B2 | 9/2021 | Ochi |
| 11,131,938 | B2 | 9/2021 | Murayama |
| 11,385,558 | B2 | 7/2022 | Chimoto |
| 11,429,032 | B2 | 8/2022 | Shibata |
| 11,624,986 | B2 | 4/2023 | Kanno |
| 11,624,987 | B2 | 4/2023 | Tokunaga |
| 11,662,670 | B2 | 5/2023 | Hama |
| 11,675,283 | B2 | 6/2023 | Kamae |
| 11,698,594 | B2 | 7/2023 | Takahashi |
| 11,714,362 | B2 | 8/2023 | Kanno |
| 11,720,036 | B2 | 8/2023 | Kobori |
| 11,762,307 | B2 | 9/2023 | Tamura |
| 11,809,131 | B2 | 11/2023 | Kamae |
| 11,835,873 | B2 | 12/2023 | Hashimoto |
| 11,914,325 | B2 | 2/2024 | Hashimoto |
| 2011/0070539 | A1 | 3/2011 | Ishizuka |
| 2012/0052434 | A1 | 3/2012 | Sugimoto |
| 2021/0302854 | A1 | 9/2021 | Kitamura |
| 2022/0197163 | A1 | 6/2022 | Kajihara |
| 2022/0197166 | A1 | 6/2022 | Chimoto |
| 2022/0197174 | A1 | 6/2022 | Kajihara |
| 2022/0342335 | A1 | 10/2022 | Ochi |
| 2022/0373911 | A1 | 11/2022 | Kamae |
| 2022/0373919 | A1 | 11/2022 | Imura |
| 2023/0305414 | A1 | 9/2023 | Imura |
| 2023/0305415 | A1 | 9/2023 | Imura |
| 2023/0305416 | A1 | 9/2023 | Kamae |
| 2023/0314973 | A1 | 10/2023 | Kajihara |
| 2023/0341790 | A1 | 10/2023 | Mitsuiki |

FOREIGN PATENT DOCUMENTS

| | | | | | |
|---|---|---|---|---|---|
| JP | 2007-264349 | A | | 10/2007 | |
| JP | 2008-20631 | A | | 1/2008 | |
| JP | 2008-65009 | A | | 3/2008 | |
| JP | 2011-13548 | A | | 1/2011 | |
| JP | 2011-65076 | A | | 3/2011 | |
| JP | 2012-53196 | A | | 3/2012 | |
| JP | 2017-146338 | A | | 8/2017 | |
| JP | 2017-203864 | A | | 11/2017 | |
| JP | 2017-223854 | | * | 12/2017 | ............... G03G 9/08 |

OTHER PUBLICATIONS

U.S. Appl. No. 18/333,853, Maki Imura, filed Jun. 13, 2023.
U.S. Appl. No. 18/613,681, Kentaro Kamae, filed Mar. 22, 2024.
U.S. Appl. No. 18/617,257, Kazunari Ooyama, filed Mar. 26, 2024.
Robert F. Fedors, "A Method for Estimating Both the Solubility Parameters and Molar Volumes of Liquids", Polymer Engineering and Science, vol. 14, No. 2, 147-154.

* cited by examiner

TONER AND TWO-COMPONENT DEVELOPER

BACKGROUND OF THE INVENTION

Field of the Invention

The present disclosure relates to a toner and a two-component developer that are used in electrophotographic methods, electrostatic recording methods, electrostatic printing methods and the like.

Description of the Related Art

In recent years, more and more electrophotographic full-color copiers are used, and the application thereof to the printing market also has begun. In the printing market, there has been a demand for higher speed, higher image quality and higher performance as well as dealing with a wide range of media (paper types). For example, there is a demand for media constant velocity, i.e., printing continues without changing a process speed or without changing a set temperature for heating a fixing unit in accordance with the paper type even when the paper type is changed from heavy paper to thin paper. From the viewpoint of media constant velocity, toners are required to be appropriately separated from a fixing belt or a fixing roller and fixed to media within a wide range of fixation temperature from a low temperature to a high temperature.

There is a method in which a release agent is added to a toner to bring release properties to the toner to fix the toner within a wide range of temperatures. In this case, the dispersion state of the release agent in the toner significantly affects the properties of the toner, thus fineness and uniformity thereof are desired. In Japanese Unexamined Patent Application No. 2011-013548, a technique of adding a dispersant, which disperses a release agent, to a toner is proposed to control the dispersion state of the release agent in the toner. In addition, Japanese Unexamined Patent Application No. 2007-264349 discloses a proposal of using a toner binder composed of a high-viscosity resin, a low-viscosity resin and a dispersant to improve the dispersibility of a release agent and suppress poor separation or image deterioration.

Furthermore, Japanese Unexamined Patent Application No. 2004-046095 proposes a toner in which a crystalline polyester is used as a binder resin of the toner as a toner having excellent low-temperature fixability for realizing fixation within a wide range of temperatures.

SUMMARY OF THE INVENTION

However, in high-speed devices that have satisfied the requirements in the printing market, there are cases where poor separation or image deterioration occurs even when the dispersion state of the release agent in the toner is controlled by the methods described in Japanese Unexamined Patent Application No. 2011-013548 and Japanese Unexamined Patent Application No. 2007-264349.

It is considered that this is because, in order to elicit the effect of the release agent, not only the uniform presence in the toner but also the feature in which, when the toner is heated or the like with a fixing member, the release agent rapidly outmigrates onto the toner surface and remains on the toner surface, is important.

Therefore, in high-speed devices, even when the dispersion state of the release agent is controlled, in a case where the bleeding out of the release agent by heating is delayed, there may be cases where poor separation or image deterioration occurs particularly in solid images. In addition, when the bleeding out of the release agent is fast, in one end part of an image, there may be cases where the release agent is not carried on the image surface, which has turned into liquid during fixation, but flows down to the paper surface in the case of a low-density image such as a halftone image or in a case where the number of toner particles present adjacent to each other is small as in a dot image. In a case where the release agent flows down to the paper surface, there are cases where the function of the release agent is impaired and the separability or the scratch resistance of the image deteriorates.

Regarding the delayed bleeding out of the release agent onto the toner surface and the downflow to the paper surface, a method of increasing the viscosity of the toner binder resin is effective. However, in the method of increasing the viscosity of the resin, the low-temperature fixability is impaired, and the media constant velocity is impaired.

Therefore, in implementing media constant velocity in high-speed devices, there are problems with the bleeding out rate of release agents onto toner surfaces, which relates to the separation of solid images, and the downflow of release agents to paper surfaces from the surface of low-density images. The present disclosure is intended for a toner in which low-temperature fixability is maintained, favorable bleeding out of a release agent in a solid image and suppression of the downflow of the release agent to a paper surface in a low-density image are both satisfied and medic constant velocity in a high-speed device is realized, and a two-component developer containing the toner.

At least one embodiment of the present disclosure relates to a toner comprising:

- a toner particle comprising a binder resin, a release agent, and a graft polymer (A), wherein
- the binder resin comprises an amorphous polyester,
- the graft polymer (A) has two or more exothermic peaks in an exothermic curve during lowering temperature measured by differential scanning calorimetric measurement,
- the release agent has at least one exothermic peak in an exothermic curve during lowering temperature measured by differential scanning calorimetric measurement, and
- when, among exothermic peaks of the graft polymer (A), a peak temperature of a highest temperature-side exothermic peak is indicated by $T_{Max}$ (° C.), a peak temperature of a lowest temperature-side exothermic peak is indicated by $T_{Min}$ (° C.), and, among exothermic peaks of the release agent, a peak temperature of a maximum exothermic peak is indicated by $T_{Wax}$ (° C.),
- $T_{Max}$, $T_{Min}$ and $T_{Wax}$ satisfy relationships of formulae (1) and (2) below:

$$5.0 \leq T_{Max} - T_{Min} \leq 20.0, \text{ and} \quad (1)$$

$$10.0 \leq T_{Wax} - T_{Max} \leq 40.0. \quad (2)$$

According to the present disclosure, it is possible to provide a toner in which low-temperature fixability is maintained, favorable bleeding out of a release agent in a solid image and suppression of the downflow of the release agent to a paper surface in a low-density image are both satisfied and medic constant velocity in a high-speed device is realized and a two-component developer containing the toner. Further features of the present invention will become apparent from the following description of exemplary embodiments.

DESCRIPTION OF THE EMBODIMENTS

In the present disclosure, the wordings "from XX to YY" and "XX to YY" expressing numerical value ranges mean numerical value ranges including the lower limit and the upper limit as endpoints, unless otherwise stated. When numerical value ranges are described stepwise, upper limits and lower limits of those numerical value ranges can be combined suitably.

A crystalline resin is a resin for which an endothermic peak is observed in differential scanning calorimetric measurement (DSC).

The present disclosure relates to a toner comprising:

a toner particle comprising a binder resin, a release agent, and a graft polymer (A), wherein the binder resin comprises an amorphous polyester, the graft polymer (A) has two or more exothermic peaks in an exothermic curve during lowering temperature measured by differential scanning calorimetric measurement, the release agent has at least one exothermic peak in an exothermic curve during lowering temperature measured by differential scanning calorimetric measurement, and when, among exothermic peaks of the graft polymer (A), a peak temperature of a highest temperature-side exothermic peak is indicated by $T_{Max}$ (° C.), a peak temperature of a lowest temperature-side exothermic peak is indicated by $T_{Min}$ (° C.), and, among exothermic peaks of the release agent, a peak temperature of a maximum exothermic peak is indicated by $T_{Wax}$ (° C.), $T_{Max}$, $T_{Min}$ and $T_{Wax}$ satisfy relationships of formulae (1) and (2) below:

$$5.0 \leq T_{Max} - T_{Min} \leq 20.0, \text{ and} \quad (1)$$

$$10.0 \leq T_{Wax} - T_{Max} \leq 40.0. \quad (2)$$

The present inventors proceeded with study of a toner in which low-temperature fixability is maintained, bleeding out of release agents in solid images and suppression of the downflow of release agents to paper surfaces in halftone images are both satisfied and medic constant velocity in high-speed devices is realized.

As a result, it was found that, in toners comprising an amorphous polyester as a binder resin, a release agent and a graft polymer (A), it is important to satisfy the following. First, the release agent needs to have at least one exothermic peak in an exothermic curve during lowering temperature measured by differential scanning calorimetric measurement. In addition, it is important that the graft polymer (A) has two or more exothermic peaks in an exothermic curve during lowering temperature measured by differential scanning calorimetric measurement (DSC). In a case where the graft polymer (A) has two or more exothermic peaks, it is considered that the graft polymer (A) has two or more segments with different crystallization temperatures, that is, has a segment with two or more different crystalline states.

In a case where the graft polymer (A) has two or more different crystalline states, there may be "a crystalline segment more likely to contribute to adsorption to the release agent" and "a crystalline segment more likely to contribute to dispersion in the binder resin", which are relative to each other, in the graft polymer (A). Therefore, these different crystalline segments can be considered to be in a more segregated-functionality state. In addition, since it is important to have an adsorption group and a dispersion group in one molecule regarding the functions as a dispersant or a surfactant, it is particularly important to have two or more different crystalline segments in one molecule of the graft polymer (A). Therefore, the graft polymer (A) can be a dispersant of the release agent.

The present inventors paid attention to the relationship between the two or more exothermic peaks of the graft polymer (A) and the exothermic peak of the release agent during the lowering temperature of differential scanning calorimetric measurement (DSC).

First, the present inventors paid attention to the difference between the highest temperature-side exothermic peak temperature $T_{Max}$ and the lowest temperature-side exothermic peak temperature $T_{Min}$ among the exothermic peaks of the graft polymer (A). That is, the exothermic peak temperature $T_{Max}$ (° C.) and the exothermic peak temperature $T_{Min}$ (° C.) need to satisfy the following formula (1).

$$5.0 \leq T_{Max} - T_{Min} \leq 20.0 \quad (1)$$

It was found that the bleeding out property of wax can be controlled with the difference $T_{Max}-T_{Min}$. The present inventors consider that a time difference in melting during heat fixation is caused due to the temperature difference $T_{Max}-T_{Min}$, the adsorption power between the release agent and the graft polymer (A) is reduced and, consequently, the bleeding out properties of the release agent improve. When $T_{Max}-T_{Min}$ is less than 5.0° C., since the adsorption power between the release agent and the graft polymer (A) is strong, the bleeding out of the release agent in solid images is delayed, and winding is likely to occur.

Furthermore, it is considered that, the above-described "crystalline segment more likely to contribute to dispersion in the binder resin" melts first, whereby a diffusion power in the binder resin is generated, the graft polymer (A) breaks away from the release agent before melting, and the bleeding out properties improve. In addition, it is found that, when the temperature difference $T_{Max}-T_{Min}$ is 5.0° C. or more, the above-described function segregation effect is more significantly developed, and when the temperature difference is 20.0° C. or less, both the adsorptive properties to the release agent and the dispersibility into the binder rein can be satisfied.

$T_{Max}-T_{Min}$ is preferably 5.5° C. to 14.0° C. and more preferably 6.0° C. to 10.0° C. $T_{Max}-T_{Min}$ can be increased or decreased with the structure of a polyolefin segment and the ratio of the mole number of the ethylene structure PE to the mole number of the propylene structure PP.

$T_{Max}$ is preferably 55.0° C. to 80.0° C. and more preferably 60.0° C. to 72.0° C. from the viewpoint of the low-temperature fixability or the release agent.

$T_{Min}$ is preferably 45.0° C. to 70.0° C. and more preferably 55.0° C. to 67.0° C. from the relationship between the resin viscosity and $T_{Max}$.

Next, the present inventors paid attention to the difference between the highest temperature-side exothermic peak temperature $T_{Max}$ in the exothermic peaks of the graft polymer (A) and the exothermic peak temperature $T_{Wax}$ of the release agent. As a result, it was found that the downflow of the release agent to paper surfaces can be controlled with the difference $T_{Wax}-T_{Max}$.

That is, $T_{Wax}$ (° C.) and $T_{Max}$ (° C.) need to satisfy the following formula (2).

$$10.0 \leq T_{Wax} - T_{Max} \leq 40.0 \quad (2)$$

The present inventors consider that this is because the release agent is present to an extent that the temperature difference $T_{Wax}-T_{Max}$ is within the above-described range, whereby the release agent that has bled rapidly crystallizes together with the graft polymer (A). Furthermore, it is considered that the above-described "crystalline segment more likely to contribute to adsorption to the release agent" rapidly crystallizes together with the release agent, whereby the downflow of the release agent to paper surfaces from the toner surface of an image dot is suppressed.

In addition, it was found that, when the temperature difference $T_{Wax}-T_{Max}$ is less than 10.0° C., since the adsorption power between the release agent and the graft polymer (A) is too strong, the bleeding out properties are likely to deteriorate. In addition, it was found that, when the temperature difference $T_{Wax}-T_{Max}$ is 40.0° C. or less, the effect of suppressing the downflow of the release agent to paper surfaces is generated. The temperature difference $T_{Wax}-T_{Max}$ is preferably 12.0° C. to 30.0° C. and more preferably 14.5° C. to 29.0° C. $T_{Wax}$ can be controlled with the kind of the release agent. $T_{Max}$ can be controlled with the polyolefin segment.

In addition, when the binder resin comprises an amorphous polyester, the low-temperature fixability improves. This is attributed to the fact that, in the polyester, the interaction of a hydrogen bond between ester groups or the like is large and the cohesive force or the strength can be increased compared with styrene/acrylic resins. Therefore, high elasticity can be achieved in spite of the low molecular weight, a decrease in the viscosity at a low temperature is also possible, and the low-temperature fixability can be improved. It is preferable that a benzene ring can be introduced into the polymer main chain, and it is easier to increase the cohesive force or the strength.

The graft polymer (A) is preferably a graft polymer having a polyolefin segment and a styrene acrylic polymer segment. The polyolefin segment can become the "crystalline segment more likely to contribute to adsorption to the release agent." In addition, the polyolefin segment is considered to be capable of contributing to the development of the highest temperature-side exothermic peak temperature $T_{Max}$. On the other hand, the styrene acrylic polymer segment can become the "crystalline segment more likely to contribute to dispersion in the binder resin." In addition, the styrene acrylic polymer segment is considered to be capable of contributing to the development of the lowest temperature-side exothermic peak temperature $T_{Min}$.

In addition, the polyolefin segment preferably (i) comprises a copolymer of ethylene and propylene, preferably (ii) has a segment having an acidic group and preferably (iii) has a value PE/PP of a ratio of the mole number of the ethylene structure PE to the mole number of the propylene structure PP of 4 to 20. When these are satisfied, it is easier to obtain the bleeding out properties of the release agent and the effect of suppressing the downflow. The polyolefin segment is more preferably an ethylene/propylene copolymer having an acidic group.

The ethylene structure (PE) refers to a form in which ethylene has reacted in the copolymer of ethylene and propylene, and the propylene structure (PP) refers to a form in which propylene has reacted in the copolymer of ethylene and propylene. From the viewpoint of controlling the adsorption power to the release agent and the exothermic peak temperatures, (i) the copolymer of ethylene and propylene is more effective. In addition, the ethylene structure (PE) having a high affinity to the release agent is dominant in terms of the adsorption power to the release agent, and the exothermic peak temperatures are easy to control with the propylene structure (PP).

In addition, from the viewpoint of controlling the temperature difference between the above-described exothermic peak temperature $T_{Max}$ and exothermic peak temperature $T_{Min}$ and controlling the bleeding out properties of the release agent, the graft polymer (A) preferably (ii) has a segment having an acidic group. It is considered that, when the polyolefin segment has an acidic group, the crystalline state is changed to change the temperature difference between the exothermic peak temperatures. In addition, it was found that the acidic group changes the affinity to the release agent, whereby the bleeding out properties can be controlled.

Furthermore, when (iii) the value (PE/PP) of the ratio of the mole number of the ethylene structure (PE) to the mole number of the propylene structure (PP) is four or more, it is significantly easy to obtain exothermic peaks of crystallization. On the other hand, it was found that, when PE/PP is 20 or less, it is easy to obtain two or more exothermic peaks. This is considered to be because the ethylene structure (PE), which is likely to crystallize within the above-described range, effectively functions. PE/PP is more preferably 5 to 15 and still more preferably 6 to 12.

In addition, the weight-average molecular weight of the polyolefin segment of the graft polymer (A) is preferably 1000 to 3000 and more preferably 1500 to 2500.

In a case where the weight-average molecular weight of the polyolefin segment is within the above-described range, it is considered that the adsorption power to the release agent, which is likely to crystallize, and the bleeding out properties can be obtained more effectively. Incidentally, when the weight-average molecular weight is 1000 or more, the adsorption power to the release agent is high, the dispersibility becomes more favorable, and it is easier to obtain the effect of suppressing the downflow. On the other hand, when the weight-average molecular weight is 3000 or less, it is considered that the adsorption power becomes more appropriate and the bleeding out properties of the release agent are likely to become more favorable.

Furthermore, the acid value of the polyolefin segment is preferably 0.5 to 16.0 mgKOH/g and more preferably 1.0 to 10.0 mgKOH/g.

In a case where the acid value of the polyolefin segment is within the above-described range, it is possible to more effectively control the temperature difference between the exothermic peak temperatures $T_{Max}$ and $T_{Min}$ the adsorptive properties to the release agent and the bleeding out properties without impairing crystallization. This is considered to be because, in a case where the acid value is 0.5 mgKOH/g or more, a change in the crystallization state becomes large, and the effect of changing the temperature difference between the exothermic peak temperatures is large. In addition, it is considered that, in a case where the acid value is 16.0 mgKOH/g or less, the dispersibility and the effect of suppressing the downflow to paper surfaces become larger without impairing the adsorption properties to the release agent.

The acid value of the graft polymer (A) is preferably 15.0 to 40.0 mgKOH/g and more preferably 20.0 to 30.0 mgKOH/g.

In a case where the acid value of the graft polymer (A) is within the above-described range, since the affinity to the amorphous polyester, which is the binder resin, is high, the dispersibility further improves, and, furthermore, the charging performance also becomes high. In a case where the acid value is 15.0 mgKOH/g or more, it is considered that the graft polymer (A) acts as a segment that holds a charge and the charging performance becomes high. In addition, in a case where the acid value is 40 mgKOH/g or less, it is considered that the affinity to the amorphous polyester becomes high, and the adsorption power to the release agent also becomes high, which makes it likely for the dispersibility of the release agent to further improve.

The content of a crystalline polyester in the toner is preferably 3 to 20 parts by mass and more preferably 5 to 15 parts by mass per 100 parts by mass of the amorphous polyester. In a case where the content of the crystalline polyester is within the above-described range, the low-temperature fixability by a plastic effect can be further obtained while holding the charge retention.

In addition, the content of the release agent in the toner is preferably 1 to 20 parts by mass and more preferably 5 to 15 parts by mass per 100 parts by mass of the amorphous polyester. In addition, the content of the graft polymer (A) in the toner is preferably 1 to 20 parts by mass and more preferably 5 to 15 parts by mass per 100 parts by mass of the amorphous polyester. In a case where the contents of the release agent and the graft polymer (A) are within the above-described range, the bleeding out properties of the release agent and the effect of suppressing the downflow to paper surfaces can be further obtained while holding the dispersibility of the release agent by the graft polymer (A).

Furthermore, when the amount of the crystalline polyester and the release agent is 20.0 parts by mass or less per 100 parts by mass of the amorphous polyester, it is easier to obtain the bleeding out properties of the release agent and the effect of suppressing the downflow to paper surfaces without impairing the charge retention or the storability.

From the viewpoint of making it easier to obtain the bleeding out properties of the release agent and the effect of suppressing the downflow to paper surfaces, the value (graft polymer (A)/release agent) of the mass-based ratio of the content of the graft polymer (A) to the content of the release agent in the toner is preferably 0.5 to 1.5, more preferably 0.8 to 1.2 and still more preferably 0.9 to 1.1.

In addition, the amorphous polyester is preferably a block copolymer having two or more different amorphous polyester segments and more preferably a block copolymer having two different amorphous polyester segments.

In a case where the amorphous polyester is the above-described block copolymer, it is easier to obtain the bleeding out properties of the release agent and the effect of suppressing the downflow to paper surfaces. In a case where the amorphous polyester is a block copolymer, it is considered that the amorphous polyester includes segments with different polarities and thus interacts with the segments having different crystalline states of the graft polymer (A), respectively, whereby the dispersibility improves. Particularly, regarding the difference between the SP value of the styrene acrylic polymer segment of the graft polymer (A) and the SP value of the two or more different amorphous polyester segments constituting the block copolymer, when the minimum difference in SP value is 1.00 $[J/cm^3]^{0.5}$ or less, the dispersibility further improves. The minimum difference in SP value is more preferably 0.50 $[J/cm^3]^{0.5}$ or less and still more preferably 0.30 $[J/cm^3]^{0.5}$ or less. The lower limit is not particularly limited, but is preferably 0.00 $[J/cm^3]^{0.5}$ or more or 0.10 $[J/cm^3]^{0.5}$ or more.

In addition, when the toner is pressure-fixed by the interaction between the two or more different amorphous polyester segments of the block copolymer, a crack is likely to be generated in the toner. This is considered to make the bleeding out properties of the release agent improve and, consequently, make the separability improve. Particularly, the SP value difference between the two or more (preferably two) different amorphous polyester segments constituting the block copolymer is preferably 1.0 $[J/cm^3]^{0.5}$ or more. Within the above-described range, a crack is more likely to be generated, and it is easier to obtain the bleeding out effect of the release agent. In addition, the SP value difference is preferably 5.0 $[J/cm^3]^{0.5}$ or less from the viewpoint of the compatibility with the crystalline polyester. For example, the SP value difference is preferably 1.0 to 5.0 $[J/cm^3]^{0.5}$, more preferably 1.0 to 3.0 $[J/cm^3]^{0.5}$ and still more preferably 1.5 to 2.5 $[J/cm^3]^{0.5}$.

Hereinafter, the graft polymer (A), the amorphous polyester, the release agent and the like will be exemplified.

Graft Polymer (A)

The graft polymer (A) preferably has a polyolefin segment and a styrene acrylic polymer segment. Examples of an olefin constituting the polyolefin segment of the graft polymer (A) include ethylene, propylene, 1-butene, isobutylene, 1-hexene, 1-dodecene, 1-octadecene and the like. Ethylene and propylene are particularly preferable.

Examples of a polyolefin include polyethylene, polyolefins, olefin copolymers, olefin copolymer oxides, modified olefin copolymers and the like. Examples of the copolymers include ethylene/propylene copolymers, ethylene/1-butene copolymers, propylene/1-hexene copolymers, oxides thereof and the like. From the viewpoint of the adsorptive properties to the release agent, ethylene/propylene copolymers and ethylene/propylene copolymer oxides are preferable.

The content proportion of the polyolefin segment in the graft polymer (A) is preferably 5 to 20 mass % and more preferably 8 to 15 mass %.

Examples of the olefin copolymer oxides include oxides having a functional group such as a carboxy group, an aldehyde group or an ester group or an epoxide. The polyolefin segment preferably has a segment having an acidic group. In order to impart an acidic group to the olefin copolymers, a method in which the olefin copolymer is converted to a functional group-containing compound or a functional group is exemplified. Examples thereof include carboxylic acid compounds having oxygen, carbon dioxide or a carboxyl group, ester compounds having an ester group, aldehyde compounds having an aldehyde group, epoxides and the like.

A method for producing the polyolefin segment is not particularly limited, and a well-known conventional method can be used. Examples of the production method include production methods in which a catalyst such as an ordinary Zieglar catalyst or a metallocene catalyst is used. In addition, in order to produce the graft polymer (A) to which different segments from which it is easy to obtain two or more peaks in DSC have bonded, a production method in which a specific production condition such as a catalyst by which living polymerization is likely to occur or a low temperature is used is preferable. Examples thereof include methods in which, for example, a nickel catalyst or a titanium catalyst is used as the catalyst by which living polymerization is likely to occur.

Examples of a method for imparting an acidic group to the polyolefin segment include methods in which a gas such as oxygen and hydrogen or carbon dioxide is supplied as appropriate at the time of producing a polyolefin with a metallocene catalyst.

In addition, examples of a different method for imparting an acidic group include methods in which an olefin polymer and a functional group-containing compound are brought into contact with each other. At that time, the contact temperature is −78° C. to +300° C. and preferably −78° C. to +200° C., and the pressure is normal pressure to 100 $kg/cm^2$ and preferably within a range of normal pressure to 50 $kg/cm^2$. In addition, the contact time is one minute to 100 hours and preferably within a range of 10 minutes to 24 hours.

The olefin polymer and the functional group-containing compound can be brought into contact with each other in a solvent or in the absence of a solvent, and examples of the solvent to be used include aliphatic hydrocarbons such as propane, butane, pentane, hexane, heptane, octane, decane, dodecane and kerosene; alicyclic hydrocarbons such as cyclopentane, cyclohexane and methylcyclopentane; aromatic hydrocarbons such as benzene, toluene and xylene; halogenated hydrocarbons such as ethylene chloride, chlorobenzene and dichloromethane, oxygen-containing compounds such as diethyl ether and tetrahydrofuran or mixtures thereof and the like.

The graft polymer (A) is preferably a graft polymer having a polyolefin segment and a styrene acrylic polymer segment. As the constitution component of a styrene acrylic polymer, the following can be exemplified.

Examples thereof include styrene-based monomers such as styrene, α-methylstyrene, p-methylstyrene, m-methylstyrene, p-methoxystyrene, p-hydroxystyrene, p-acetoxystyrene, vinyltoluene, ethylstyrene, phenylstyrene and benzylstyrene; alkyl esters of an unsaturated carboxylic acid (the number of carbon atoms in the alkyl is from 1 to 18) such as methyl acrylate, ethyl acrylate, butyl acrylate, 2-ethylhexyl acrylate, stearyl acrylate, methyl methacrylate, ethyl methacrylate, butyl methacrylate, 2-ethylhexyl methacrylate, stearyl methacrylate and cycloalkyl (meth)acrylate; hydroxyalkyl esters of an unsaturated carboxylic acid such as 2-hydroxyethyl (meth)acrylate; vinyl ester-based monomers such as vinyl acetate; vinyl ether-based monomers such as vinyl methyl ether; halogen atom-containing vinyl-based monomers such as vinyl chloride; diene-based monomers such as butadiene and isobutylene. These can be used singly or two or more thereof can be jointly used.

The styrene acrylic polymer segment is preferably a styrene acrylic acid ester copolymer. In addition, the styrene acrylic polymer segment is preferably a polymer of a monomer mixture comprising styrene and a (meth)acrylic acid alkyl ester in which the number of carbon atoms in an alkyl group is 1 to 20 (preferably 3 to 18 and more preferably 3 to 6). The styrene acrylic polymer segment is more preferably a copolymer of a monomer mixture comprising styrene and butyl acrylate. The monomer mixture may further contain (meth)acrylic acid, 2-hydroxyethyl (meth) acrylate or the like.

The content of a monomer unit derived from the styrene-based monomer in the graft polymer (A) is preferably from 50.0 mass % to 85.0 mass % and more preferably from 60.0 mass % to 80.0 mass %. The content of a monomer unit derived from the (meth)acrylic acid alkyl ester in the graft polymer (A) is preferably from 2.0 mass % to 15.0 mass % and more preferably from 5.0 mass % to 10.0 mass %. The monomer unit refers to a form with which a monomer substance in the polymer has reacted.

In addition, the content proportion of the styrene acrylic polymer segment in the graft polymer (A) is preferably 80 to 95 mass % and more preferably 85 to 92 mass %.

A method for the graft polymerization of the styrene acrylic polymer with the polyolefin is not particularly limited, and a well-known conventional method can be used. In addition, as a method in which it is easy for the graft polymer (A) to obtain two peaks in DSC, multi-stage polymerization of the polyolefin and the styrene acrylic polymer is more preferable. High-temperature pressure polymerization can be used for the improvement of the grafting rate of the graft polymer (A) and the adjustment of the molecular weight.

The weight-average molecular weight (Mw) of the graft polymer (A) is preferably from 5000 to 70000 and more preferably from 10000 to 50000.

In a case where the weight-average molecular weight of the graft polymer (A) is within the above-described range, the movement of the polymer in the toner becomes appropriate. As a result, the dispersibility of the release agent further improves, and the blocking resistance of the toner further improves.

Release Agent

The release agent that is used in the toner is a material that is crystallizable and has an exothermic peak in differential scanning calorimetric measurement (DSC), and examples thereof include the following.

Hydrocarbon waxes such as low-molecular weight polyethylene, low-molecular weight polypropylene, alkylene copolymers, microcrystalline waxes, paraffin waxes and Fischer-Tropsch waxes; oxides of a hydrocarbon-based wax such as oxidized polyethylene wax or block copolymers thereof; waxes comprising a fatty acid ester such as carnauba wax as a main component; release agents obtained by partially or fully deoxidizing a fatty acid ester such as deoxidized carnauba wax. Saturated straight chain fatty acids such as palmitic acid, stearic acid and montanic acid; unsaturated fatty acids such as brassidic acid, eleostearic acid and parinaric acid; saturated alcohols such as stearyl alcohol, aralkyl alcohol, behenyl alcohol, carnaubil alcohol, ceryl alcohol and melissyl alcohol; polyhydric alcohols such as sorbitol; esters of a fatty acid such as palmitic acid, stearic acid, behenic acid or montanic acid and an alcohol such as stearyl alcohol, aralkyl alcohol, behenyl alcohol, carnaubil alcohol, ceryl alcohol or melissyl alcohol; fatty acid amides such as linoleic acid amide, oleic acid amide and lauric acid amide; saturated fatty acid bisamides such as methylene bisstearamide, ethylene biscapric acid amide, ethylene bislauric acid amide and hexamethylene bisstearamide; unsaturated fatty acid amides such as ethylenebisoleic acid amide, hexamethylenebisoleic acid amide, N,N'dioleyladipic acid amide and N,N'dioleyl sebacic acid amide; aromatic bisamides such as m-xylene bisstearamide and N,N'distearyl isophthalic acid amide; aliphatic metal salts (release agents ordinarily referred to as metal soaps) such as calcium stearate, calcium laurate, zinc stearate and magnesium stearate; waxes obtained by grafting a vinyl-based monomer such as styrene or acrylic acid to an aliphatic hydrocarbon-based wax; partially esterified products of a fatty acid and a polyhydric alcohol such as behenic acid monoglyceride; methyl ester compounds having a hydroxyl group obtained by hydrogenation of vegetable oils and fats.

Among these release agents, hydrocarbon waxes such as paraffin wax and Fischer-Tropsch wax are preferable from the viewpoint of the affinity to the graft polymer (A). That is, the release agent preferably comprises a hydrocarbon wax and is more preferably a hydrocarbon wax.

In addition, from the viewpoint of the affinity to the polyolefin segment, which is the adsorption segment of the graft polymer (A), and the bleeding out properties, the weight-average molecular weight of the release agent is preferably 250 to 3000, more preferably 400 to 2700 and still more preferably 450 to 1500.

In addition, similarly, from the viewpoint of the affinity, the value $(PE/PP)_{WAX}$ of the ratio of the mole number of the ethylene structure (PE) to the mole number of the propylene structure (PP) in the hydrocarbon wax is preferably close to the value (PE/PP) of the above-described ratio in the graft polymer (A) (hereinafter, $(PE/PP)_{GRAFT}$). Particularly, the difference between the value $(PE/PP)_{WAX}$ of the ratio and the value $(PE/PP)_{GRAFT}$ of the ratio of the graft polymer (A) is preferably less than 50. Furthermore, from the viewpoint of the bleeding out properties, the ratio $(PE/PP)_{WAX}$ and the ratio $(PE/PP)_{GRAFT}$ are preferably not the same as each other to avoid excessive adsorption.

When the peak temperature of the maximum exothermic peak during lowering temperature measurement by the differential scanning calorimetric measurement (DSC) of the release agent is indicated by $T_{Wax}$, the peak temperature $T_{Wax}$ is preferably 70° C. to 120° C. and more preferably 80° C. to 110° C. from the viewpoint of the low-temperature fixability and the separability.

Amorphous Polyester

As a monomer that is used in the amorphous polyester, polyhydric alcohols (di, tri or higher-hydric alcohols), polyhydric carboxylic acids (di, tri or higher-hydric carboxylic acids), acid anhydride thereof or lower alkyl esters thereof are used.

As a polyhydric alcohol monomer, the following polyhydric alcohol monomers can be used.

Examples of a dihydric alcohol component include ethylene glycol, propylene glycol, 1,3-butanediol, 1,4-butanediol, 2,3-butanediol, diethylene glycol, triethylene glycol, 1,5-pentanediol, 1,6-hexanediol, neopentyl glycol, 2-ethyl-1,3-hexanediol, hydrogenated bisphenol A, bisphenol represented by a formula (A) and derivatives thereof;

(A)

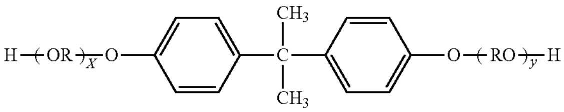

(in the formula, R is ethylene or a propylene group, x and y are each an integer of 0 or more, and the average value of x+y is from 0 to 10.); and diols represented by a formula (B)

(B)

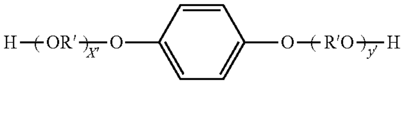

(In the formula, R' is

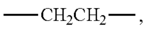,
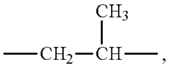, or
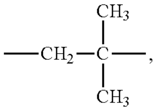, and x' and y' are each an integer equal to or greater than 0, such that the average value of x'+y' is from 0 to 10.)

Examples of a trihydric or higher alcohol component include sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, 2-methylpropanetriol, 2-methyl-1,2,4-butanetriol, trimethylolethane, trimethylolpropane and 1,3,5-trihydroxymethylbenzene. Among these, glycerol, trimethylolpropane and pentaerythritol are preferably used. These dihydric alcohols and trihydric or higher alcohols can be used singly or a plurality thereof can be jointly used.

As a polyhydric carboxylic acid monomer of the polyester resin, the following polyhydric carboxylic acid monomers can be used.

Examples of dihydric carboxylic acid component include maleic acid, fumaric acid, citraconic acid, itaconic acid, glutaconic acid, phthalic acid, isophthalic acid, terephthalic acid, succinic acid, adipic acid, sebacic acid, azelaic acid, malonic acid, n-dodecenylsuccinic acid, isododecenylsuccinic acid, n-dodecylsuccinic acid, isododecylsuccinic acid, n-octenylsuccinic acid, n-octylsuccinic acid, isooctenylsuccinic acid, isooctylsuccinic acid, anhydrides of these acids and lower alkyl esters thereof. Among these, maleic acid, fumaric acid, terephthalic acid and n-dodecenylsuccinic acid are preferably used.

Examples of tri- or higher hydric carboxylic acids, acid anhydrides thereof or lower alkyl esters thereof include 1,2,4-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, 1,2,4-cyclohexanetricarboxylic acid, tetra(methylenecarboxyl) methane, 1,2,7,8-octanetetracarboxylic acid, pyromellitic acid, empol trimer acid, acid anhydrides thereof or lower alkyl esters thereof. Among these, particularly, 1,2,4-benzenetricarboxylic acid, that is, trimellitic acid or a derivative thereof, is preferably used since trimellitic acid or the derivative thereof is inexpensive and reaction control is easy. These dihydric carboxylic acids and the like and tri- or higher hydric carboxylic acids can be used singly or a plurality thereof can be jointly used.

A method for producing the polyester is not particularly limited, and a well-known method can be used. For example, the polyester resin is produced by preparing the above-described alcohol monomer and carboxylic acid monomer at the same time and polymerizing the monomer by an esterification reaction or a transesterification reaction and a condensation reaction. In addition, the polymerization temperature is not particularly limited, but is preferably in a range of from 180° C. to 290° C. At the time of the polymerization of the polyester, for example, a polymerization catalyst such as a titanium-based catalyst, a tin-based catalyst, zinc acetate, antimony trioxide or germanium dioxide can be used. Particularly, the amorphous polyester is more preferably a polyester polymerized using a tin-based catalyst.

The binder resin that is used in the toner may be a hybrid resin comprising other resin components as long as the hybrid resin comprises the amorphous polyester as a main component. Examples thereof include hybrid resins of the polyester resin and a vinyl-based resin. As a method for obtaining a reaction product of a vinyl-based resin or a vinyl-based copolymer unit and the polyester resin like the hybrid resin, a method in which, in a place where a polymer comprising a monomer component capable of reacting with each of the vinyl-based resin or the vinyl-based copolymer unit and the polyester resin is present, a polymerization reaction of any one or both of the resins is performed is preferable.

Examples of, for example, a monomer capable of reacting with the vinyl-based copolymer among the monomers constituting the polyester resin component include unsaturated dicarboxylic acids such as phthalic acid, maleic acid, citraconic acid and itaconic acid, anhydrides thereof and the like. Examples of a monomer capable of reacting with the polyester resin component among the monomers constituting the vinyl-based copolymer component include monomers having a carboxyl group or a hydroxy group and acrylic acid or methacrylic acid esters.

In addition, as the binder resin, aside from the above-described vinyl-based resins, a variety of resin compounds that are conventionally known as binder resins can be jointly used as long as the resin compounds contain the amorphous polyester as a main component. Examples of such resin compounds include phenolic resins, natural resin-modified phenolic resins, natural resin-modified maleic resins, acrylic resins, methacrylic resins, polyvinyl acetate resins, silicone resins, polyester resins, polyurethane, polyamide resins, furan resins, epoxy resins, xylene resins, polyvinyl butyral, terpene resins, coumarone-indene resins, petroleum-based resins and the like.

The content proportion of the amorphous polyester in the binder resin is preferably 50 to 100 mass % and more preferably 80 to 100 mass %.

In addition, the amorphous polyester is preferably a block copolymer having two or more different amorphous polyester segments.

A method for obtaining a block copolymer from two or more different amorphous polyester segments is not particularly limited and can be selected as appropriate depending on the purpose, and examples thereof include methods described in the following (1) to (3) and the like, but (1) and (3) are preferable and (1) is more preferable from the viewpoint of the degree of freedom in molecular design.

(1) A method in which one amorphous polyester prepared in advance by a polymerization reaction and another amorphous polyester prepared in advance by a polymerization reaction are dissolved or dispersed in an appropriate solvent and copolymerized by a reaction with an extender having two or more functional groups that react with a hydroxyl group at a polymer chain end such as carboxylic acid, an isocyanate group, an epoxy group or a carbodiimide group.

(2) A method in which one amorphous polyester prepared in advance by a polymerization reaction and another amorphous polyester prepared in advance by a polymerization reaction are injected into a twin screw extruder together with a transesterification catalyst or the like and a block copolymer is prepared by a reactive extrusion method using the twin screw extrude or the like.

(3) A method in which a hydroxyl group of one amorphous polyester prepared in advance by a polymerization reaction is used as a polymerization initiation component, and another amorphous polyester is ring-opening polymerized from a polymer chain end of the prepared amorphous polyester, thereby copolymerizing a block copolymer.

In addition, the peak molecular weight of the amorphous polyester is from 3500 to 20000, which is preferable from the viewpoint of the low-temperature fixability or the like. In addition, the acid value of the amorphous polyester is from 5 mgKOH/g to 30 mgKOH/g, which is preferable from the viewpoint of the charge retention in a high-temperature and high-humidity environment. Furthermore, the hydroxyl value of the amorphous polyester is preferably from 20 mgKOH/g to 70 mgKOH/g from the viewpoint of the low-temperature fixability and the charge retention.

The amorphous polyester is preferably a condensation polymer of a monomer mixture comprising a bisphenol represented by a formula (A) and terephthalic acid. In the case of using a block copolymer having two or more different amorphous polyester segments, the block copolymer preferably comprises the condensation polymer of the monomer mixture comprising the bisphenol represented by a formula (A) and terephthalic acid (condensation polymer c1) as one of the segments. The SP value $[J/cm^3]^{0.5}$ of the condensation polymer c1 is preferably 12.0 to 13.5 and more preferably 12.5 to 13.0.

In addition, as a different segment, the amorphous polyester preferably has a segment containing a straight-chain aliphatic diol having 2 to 4 carbon atoms (preferably having 2 or 3 carbon atoms) as a constitution monomer. The different segment is more preferably a monomer condensation polymer containing a straight-chain aliphatic diol having 2 to 4 carbon atoms (preferably having 2 or 3 carbon atoms) and terephthalic acid. The SP value $[J/cm^3]^{0.5}$ of the different segment is preferably 10.0 to 11.5 and more preferably 10.5 to 11.0.

Crystalline Polyester

In the toner, a crystalline polyester can be used to improve the low-temperature fixability and the scratch resistance. A toner particle may comprise a crystalline polyester. In addition, in order to more effectively suppress the downflow of the release agent to paper surfaces, the exothermic peak temperature $T_{CPES}$ of an exothermic curve during lowering temperature measured by the differential scanning calorimetric measurement (DSC) of the crystalline polyester and the exothermic peak temperature $T_{Wax}$ of the release agent preferably satisfy the following formula (3).

$$|T_{CPES} - T_{Wax}| \leq 40 \quad (3)$$

It is considered that, when the exothermic peak temperatures of the crystalline polyester and the release agent are close to each other, it is possible to prevent the release agent from being swept away from above dots to a side where crystallization is delayed that is in a liquid state during cooling and solidification. In addition, it is considered that both the release agent and the crystalline polyester can remain on dots, whereby the separability and the scratch resistance further improve.

In addition, for the same reason, the exothermic peak temperature $T_{Maxx}$ of the graft polymer (A) and the exothermic peak temperature $T_{CPES}$ preferably satisfy the following formula (4).

$$T_{CPES} - T_{Max} \leq 40 \quad (4)$$

The melting point of the crystalline polyester is preferably 65° C. to 110° C. and more preferably 80° C. to 100° C.

As a monomer that is used in the crystalline polyester, polyhydric alcohols (di, tri or higher hydric alcohols), polyhydric carboxylic acids (di, tri or higher hydric carboxylic acids), acid anhydrides thereof and lower alkyl esters thereof are used.

As a polyhydric alcohol monomer that is used in the crystalline polyester, the following polyhydric alcohol monomers can be used. The polyhydric alcohol monomers are not particularly limited, chain (more preferably linear) aliphatic diols are preferable, and examples thereof include ethylene glycol, diethylene glycol, triethylene glycol, 1,2-propylene glycol, 1,3-propylene glycol, dipropylene glycol, 1,4-butanediol, 1,4-butadiene glycol, trimethylene glycol, tetramethylene glycol, pentamethylene glycol, hexamethylene glycol, octamethylene glycol, nonamethylene glycol, decamethylene glycol and neopentyl glycol. Among these, particularly, straight chain aliphatic, α and ω-diols such as ethylene glycol, diethylene glycol, 1,4-butanediol and 1,6-hexanediol are preferably exemplified.

It is also possible to use polyhydric alcohol monomers other than the above-listed polyhydric alcohols. Among the polyhydric alcohol monomers, examples of dihydric alcohol monomers include aromatic alcohols such as polyoxyethylenated bisphenol A and polyoxypropylenated bisphenol A; 1,4-cyclohexanedimethanol and the like. In addition, among the polyhydric alcohol monomers, examples of tri- or higher hydric alcohol monomers include aromatic alcohols such as 1,3,5-trihydroxymethylbenzene; aliphatic alcohols such as pentaerythritol, dipentaerythritol, tripentaerythritol, 1,2,4-butanetriol, 1,2,5-pentanetriol, glycerin, 2-methyl propanetriol, 2-methyl-1,2,4-butanetriol, trimethylolethane and trimethylolpropane, and the like.

As a polyhydric carboxylic acid monomer that is used in the crystalline polyester, the following polyhydric carboxylic acid monomers can be used. The polyhydric carboxylic acid monomers are not particularly limited, and chain (more preferably linear) aliphatic carboxylic acids are preferable.

Specific examples thereof include oxalic acid, malonic acid, succinic acid, glutaric acid, adipic acid, pimelic acid, suberic acid, glutaconic acid, azelaic acid, sebacic acid, nonanedicarboxylic acid, decanedicarboxylic acid, undecanedicarboxylic acid, dodecanedicarboxylic acid, maleic acid, fumaric acid, mesaconic acid, citraconic acid and itaconic acid, and monomers obtained by hydrolyzing an acid anhydride or lower alkyl ester thereof and the like are also included.

It is also possible to use polyhydric carboxylic acids other than the above-listed polyhydric carboxylic acid monomers. Among the other polyhydric carboxylic acid monomers, examples of dihydric carboxylic acids include aromatic carboxylic acids such as isophthalic acid and terephthalic acid; aliphatic carboxylic acids such as n-dodecylsuccinic acid and n-dodecenylsuccinic acid; alicyclic carboxylic acids such as cyclohexanedicarboxylic acid, and acid anhydrides or lower alkyl esters thereof and the like are also included.

In addition, among the other carboxylic acid monomers, examples of tri or higher hydric carboxylic acids include aromatic carboxylic acids such as 1,2,4-benzenetricarboxylic acid (trimellitic acid), 2,5,7-naphthalenetricarboxylic acid, 1,2,4-naphthalenetricarboxylic acid and pyromellitic acid and aliphatic carboxylic acids such as 1,2,4-butanetricarboxylic acid, 1,2,5-hexanetricarboxylic acid and 1,3-dicarboxyl-2-methyl-2-methylenecarboxypropane, and derivatives such as acid anhydrides or lower alkyl esters thereof and the like are also included.

The crystalline polyester is preferably a modified crystalline polyester having a structure in which an aliphatic monocarboxylic acid having 16 to 31 carbon atoms (preferably having 18 to 24 carbon atoms) has been condensed (end-modified) into a hydroxy group of a main chain end or a modified crystalline polyester having a structure in which an aliphatic monoalcohol having 15 to 30 carbon atoms (preferably having 17 to 23 carbon atoms) has been condensed (end-modified) into a carboxy group of a main chain end from the viewpoint of the charging performance and the dispersion effect of the graft polymer (A) into the release agent.

It is considered that, when the hydroxy group or the like of the main chain end is modified, charge leakage is suppressed and the charging performance improves. In addition, when the number of carbon atoms is within the above-described range, it is possible to avoid the adsorption inhibition of the crystalline polyester to the release agent, which is caused by the excessive interaction between the polyolefin segment of the graft polymer (A) and the crystalline polyester, and the dispersibility of the release agent becomes more favorable.

Examples of the aliphatic monocarboxylic acid monomer having 16 to 31 carbon atoms include palmitic acid (hexadecanoic acid), margaric acid (heptadecanoic acid), stearic acid (octadecanoic acid), nonadecyl acid, arachidic acid (icosanoic acid), henicosanoic acid, docosanoic acid (behenic acid), tetracosanoic acid, hexacosanoic acid, octacosanoic acid and triacontanic acid.

Examples of the aliphatic monoalcohol having 15 to 30 carbon atoms include palmityl alcohol (hexadecanol), margaryl alcohol (heptadecanol), stearyl alcohol (octadecanol), nonadecanol, arachidyl alcohol (icosanol), heneicosanol, behenyl alcohol, lignoceryl alcohol, ceryl alcohol, 1-heptacosanol, montanyl alcohol, 1-nonacosanol and myricyl alcohol.

The content of the crystalline polyester is preferably from 3 parts by mass to 20 parts by mass per 100 parts by mass of the amorphous polyester from the viewpoint of the low-temperature fixability, the scratch resistance and the charge retention in a high-temperature and high-humidity environment.

The crystalline polyester can be produced according to a normal polyester synthesis method. For example, the crystalline polyester can be obtained by performing an esterification reaction or a transesterification reaction of the above-described carboxylic acid monomer and alcohol monomer and then performing a polycondensation reaction under reduced pressure or by introducing a nitrogen gas. After that, furthermore, at least one selected from the group consisting of the above-described aliphatic monocarboxylic acids and aliphatic monoalcohols, and an esterification reaction is performed, whereby a desired crystalline polyester can be obtained.

The esterification reaction or transesterification reaction can be performed using a normal esterification catalyst or transesterification catalyst such as sulfuric acid, titanium butoxide, dibutyltin oxide, manganese acetate or magnesium acetate as necessary.

In addition, the polycondensation reaction can be performed using a normal polymerization catalyst, for example, a well-known catalyst such as titanium butoxide, dibutyltin oxide, tin acetate, zinc acetate, tin disulfide, antimony trioxide or germanium dioxide. The polymerization temperature and the amount of the catalyst are not particularly limited and may be determined as appropriate.

In the esterification or transesterification reaction or the polycondensation reaction, a method in which all monomers are collectively charged or a dihydric monomer is reacted first and then a tri- or higher hydric monomer is added and reacted to decrease the amount of a low-molecular-weight component may be used to increase the strength of a crystalline polyester to be obtained.

Colorant

The toner particle may comprise a colorant as necessary. Examples of the colorant include the following colorants. Examples of black colorants include carbon black; colorants toned to black using a yellow colorant, a magenta colorant and a cyan colorant. As the colorant, a pigment may be used singly or a dye and a pigment may be jointly used. It is preferable to jointly use a dye and a pigment from the viewpoint of the image qualities of full-color images.

Examples of a pigment for a magenta toner include the following pigments. C. I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, 269, 282; C. I. Pigment Violet 19; C. I. Bat Red 1, 2, 10, 13, 15, 23, 29, 35.

Examples of a dye for a magenta toner include the following dyes. Oil-soluble dyes such as C. I. Solvent Red 1, 3, 8, 23, 24, 25, 27, 30, 49, 81, 82, 83, 84, 100, 109, 121; C. I. Dispersed Red 9; C. I. Solvent Violet 8, 13, 14, 21, 27; C. I. Dispersed Violet 1, basic dyes such as C. I. Basic Red 1, 2, 9, 12, 13, 14, 15, 17, 18, 22, 23, 24, 27, 29, 32, 34, 35, 36, 37, 38, 39, 40; C. I. Basic Violet 1, 3, 7, 10, 14, 15, 21, 25, 26, 27, 28.

Examples of a pigment for a cyan toner include the following pigments. Examples thereof include C. I. Pigment Blue 2, 3, 15:2, 15:3, 15:4, 16, 17; C. I. Bat Blue 6; C. I. Acid Blue 45, copper phthalocyanine pigments having 1 to 5 phthalimidomethyl groups in the phthalocyanine skeleton as substituents. Examples of a dye for a cyan toner include C. I. Solvent Blue 70.

Examples of a pigment for a yellow toner include the following pigments. Examples thereof include C. I. Pigment Yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181, 185; C. I. Bat Yellow 1, 3, 20. Examples of a dye for a yellow toner include C. I. Solvent Yellow 162.

These colorants can be used singly or in a mixed form, furthermore, in a solid solution state. The colorant is selected from the viewpoint of hue angle, saturation, brightness, light fastness, OHP transparency, and dispersibility in the toner particle.

The content of the colorant is preferably 0.1 parts by mass to 30.0 parts by mass with respect to the total amount of the resin components.

Charge Control Agent

The toner particle may comprise a charge control agent as necessary. Blending of the charge control agent makes the stabilization of charge characteristics and the control of the optimal triboelectric charge quantity in accordance with developing systems possible. As the charge control agent, a well-known charge control agent can be used, but a metal compound of an aromatic carboxylic acid that is colorless, has a fast toner charging speed and is capable of stably holding a constant charge quantity is preferable.

Examples of a negative charge control agent include salicylic acid metal compounds, naphthoic acid metal compounds, dicarboxylic acid metal compounds, polymeric compounds having sulfonic acid or carboxylic acid in a side chain, polymeric compounds having a sulfonic acid salt or a sulfonic acid ester in a side chain, polymeric compounds having a carboxylic acid salt or a carboxylic acid ester in a side chain, boron compounds, urea compounds, silicon compounds and calixarene.

The charge control agent may be added to the toner particle internally or externally. The content of the charge control agent is preferably 0.2 parts by mass to 10.0 parts by mass and more preferably 0.5 parts by mass to 10.0 parts by mass with respect to 100 parts by mass of the binder resin.

Inorganic Fine Particle

The toner may comprise an inorganic fine particle as necessary.

The inorganic fine particle may be internally added to the toner particle or mixed with the toner particle as an external additive. Examples of the inorganic fine particle include fine particles such as silica fine particles, titanium oxide fine particles, alumina fine particles or fine particles of a composite oxide thereof. Among the inorganic fine particles, silica fine particles and titanium oxide fine particles are preferable for flowability improvement and uniform charging. The inorganic fine particle is preferably hydrophobilized with a hydrophobic agent such as a silane compound, silicone oil or a mixture thereof.

From the viewpoint of improving the flowability, the inorganic fine particle as an external additive preferably has a specific surface area of 50 $m^2/g$ to 400 $m^2/g$. In addition, from the viewpoint of improving the durable stability, the inorganic fine particle as an external additive preferably has a specific surface area of 10 $m^2/g$ to 50 $m^2/g$. In order to satisfy both the flowability improvement and the durable stability, inorganic fine particles having specific surface areas within the above-described ranges may be jointly used.

The content of the external additive is preferably 0.1 parts by mass to 10.0 parts by mass with respect to 100 parts by mass of the toner particle. The toner particle and the external additive can be used together using a well-known mixer such as a Henschel mixer.

Magnetic Carrier

The toner can also be used as a one-component developer, but is preferably used as a two-component developer after being mixed with a magnetic carrier to further improve dot reproducibility and to supply images that are stable for a long period of time.

The toner is preferably a toner for being used in the two-component developer. It is preferable that the two-component developer comprises a toner and a magnetic carrier and the toner is the above-described toner.

As the magnetic carrier, ordinarily well-known magnetic carriers, for example, iron oxide; metal particles such as iron, lithium, calcium, magnesium, nickel, copper, zinc, cobalt, manganese, chromium, strontium and rare earths, alloy particles thereof and oxide particles thereof; magnetic substances such as ferrite and magnetite; magnetic substance-dispersed resin carriers (so-called resin carriers) comprising this magnetic substance and a binder resin that holds this magnetic substance in a dispersed state and magnetic carriers in a form of ferrite or magnetite particles having pores filled with a resin can be used.

As the magnetic carrier, the above-described magnetic substances may be directly used or magnetic substances in which the above-described magnetic substance is used as the core and the surface thereof is coated with a resin may be used. From the viewpoint of improving the charging performance of the toner, the magnetic substance in which the above-described magnetic substance is used as the core and the surface thereof is coated with a resin is preferably used as the magnetic carrier.

The resin that coats the core is not particularly limited, a well-known resin can be selected and used as long as the toner characteristics are not impaired, and resins such as (meth)acrylic resins, silicone resins, urethane resins, polyethylene, polyethylene terephthalate, polystyrene and phenolic resins, copolymers or polymer mixtures comprising the resin and the like can be used.

From the viewpoint of the charging characteristics, preventing the attachment of a foreign substance to the carrier surface or the like, a (meth)acrylic resin or a silicone resin is preferably used. Particularly, a (meth)acrylic resin having an alicyclic hydrocarbon group such as a cyclohexyl group, a cycloheptyl group, a cyclooctyl group, a cyclopentyl group, a cyclobutyl group or a cyclopropyl group is a particularly preferable form since the surface (coated film surface) of a resin coating layer that coats the surface of the magnetic substance becomes flat and the attachment of a toner-derived component such as the binder resin, the release agent or the external additive can be suppressed.

Developer

In a case where the toner is used as a two-component developer after being mixed with the magnetic carrier, regarding the mixing rate of the magnetic carrier at that time, the concentration of the toner in the two-component developer is preferably 2 mass % to 15 mass % and more preferably 4 mass % to 13 mass % or less.

Method for Producing Toner

A method for producing a toner is not particularly limited, and a well-known method such as a pulverization method, a suspension polymerization method, a dissolution suspension method, an emulsion aggregation method or a dispersion polymerization method can be used.

Hereinafter, a procedure for producing a toner by the pulverization method will be described. The pulverization method has, for example, a raw material mixing step of mixing the amorphous polyester as the binder resin, the release agent, the graft polymer (A) and other components such as the crystalline polyester, the colorant and the charge control agent as necessary, a step of melt-kneading the mixed raw materials to obtain a resin composition and a step of pulverizing the obtained resin composition to obtain a toner particle.

In the raw material mixing step, as materials that constitute the toner particle, for example, predetermined amounts of the amorphous polyester (binder resin), the release agent, the graft polymer (A) and other components such as the crystalline polyester, the colorant and the charge control agent as necessary are weighed, blended and mixed. Examples of a mixing device include a double cone mixer, a V-type mixer, a drum-type mixer, a super mixer, a Henschel mixer, a Nauta mixer, MECHANO HYBRID (manufactured by Nippon Coke and Engineering Company, Limited) and the like.

Next, the mixed materials are melt-kneaded to disperse the release agent and the like in the binder resin. In the melt kneading step, a batch-type kneading machine such as a pressure kneader or a Banbury mixer or a continuous kneading machine can be used, and single or twin extruders have become mainstream due to superiority enabling continuous production. Examples thereof include a KTK-type twin screw extruder (manufactured by Kobe Steel, Ltd.), a TEM-type twin screw extruder (manufactured by Shibaura Machine Co., Ltd.), a PCM kneader (manufactured by Ikegai Corp.), a twin screw extruder (manufactured by KCK Co., Ltd.), a co-kneader (manufactured by Buss AG), KNEADEX (manufactured by Nippon Coke and Engineering Company, Limited) and the like. Furthermore, the resin composition that is obtained by melt kneading may be rolled with two roller or the like and cooled with water or the like in a cooling step.

Incidentally, the cooled product of the resin composition is pulverized up to a desired particle diameter in the pulverizing step. In the pulverizing step, the cooled resin composition is coarsely pulverized with a pulverizer such as a crusher, a hammer mill or a feather mill. After that, the cooled resin composition is finely pulverized with Kryptron System (manufactured by Kawasaki Heavy Industries, Ltd.), SUPER ROTOR (manufactured by Nisshin Engineering Inc.), TURBO MILL (manufactured by Turbo Kogyo Co., Ltd.) or an air-jet type pulverizer.

After that, the pulverized resin composition is classified using a classifier or a sieving machine such as an inertial classification-type elbow jet (manufactured by Nittetsu Mining Co., Ltd.), centrifugal force classification-type TURBOPLEX (manufactured by Hosokawa Micron Company), TSP separator (manufactured by Hosokawa Micron Company) or FACULTY (manufactured by Hosokawa Micron Company) as necessary.

The obtained toner particle may be used as a toner as it is. A toner may be obtained by externally treating the surface of the toner particle with an external additive as necessary. Examples of a method for externally treating the surfaces with an external additive include methods in which predetermined amounts of the classified toner and a variety of well-known external additives are blended and stirred and mixed using a mixing device such as a double cone mixer, a V-type mixer, a drum-type mixer, a super mixer, a Henschel mixer, a Nauta mixer, MECHANO HYBRID (manufactured by Nippon Coke and Engineering Company, Limited) or NOB-VC (manufactured by Hosokawa Micron Group) as an external addition device.

Methods for measuring a variety of physical properties of the toner and the raw materials will be described below.

Method for Separating Each Material from Toner

Each material can be separated from the toner using the difference in the solubility in the solvent of each material that is contained in the toner.

First separation: The toner is dissolved in methyl ethyl ketone (MEK) (23° C.) to separate soluble components (the amorphous polyester, the crystalline polyester, the release agent, the graft polymer (A) and the colorant) and insoluble components (the inorganic fine particle and the like).

Second separation: The soluble components (the amorphous polyester, the crystalline polyester, the release agent, the graft polymer (A) and the colorant) obtained in the first separation are dissolved in tetrahydrofuran (THF) (23° C.) to separate insoluble components (the amorphous polyester, the graft polymer (A) and the colorant) and soluble components (the crystalline polyester and the release agent).

Third separation: The soluble components (the crystalline polyester and the release agent) obtained in the second separation are dissolved in hexane (23° C.) to separate a soluble component (the release agent) and an insoluble component (the crystalline polyester).

In addition, the insoluble components (the amorphous polyester, the graft polymer (A) and the colorant) obtained in the second separation are dissolved in chloroform and preparatively separated by preparative HPLC (LC-9130

NEXT preparative column [60 cm] manufactured by Japan Analytical Industry Co., Ltd.).

Measurement of Maximum Exothermic Peak Temperature $T_{Wax}$ of Release Agent and Highest Temperature-side Exothermic Peak Temperature $T_{Max}$ and Lowest Temperature-side Exothermic Peak Temperature $T_{Min}$ of Graft Polymer (A)

The maximum exothermic peak temperature $T_{Wax}$ of the release agent, the highest temperature-side exothermic peak temperature $T_{Max}$ and the lowest temperature-side exothermic peak temperature $T_{Min}$ of the graft polymer (A) are measured using a differential scanning calorimeter "Q2000" (manufactured by TA Instruments) according to ASTM D3418-82.

For the temperature correction of the device detection part, the melting points of indium and zinc are used, and, for the correction of the amount of heat, the heat of fusion of indium is used. Specifically, 3 mg of the release agent or the graft polymer (A) is weighed and put into an aluminum pan, and the temperature-endothermic quantity curve is measured under the following conditions using an empty aluminum pan as a reference.

Rising temperature rate: 10° C./min

Measurement onset temperature: 30° C.

Measurement end temperature: 180° C.

Measurement is performed in a measurement range from 30° C. to 180° C. at a rising temperature rate of 10° C./min. The temperature is increased up to 180° C. once and held for 10 minutes, and, subsequently, the temperature-exothermic quantity curve is measured under the following conditions Lowering temperature rate: 10° C./min Measurement onset temperature: 180° C.

Measurement end temperature: 30° C.

From the exothermic peak temperatures of the temperature-exothermic quantity curve that is obtained in this lowering temperature process, the exothermic peak temperature $T_{Wax}$ of the release agent, the highest temperature-side exothermic peak temperature $T_{Max}$ and the lowest temperature-side exothermic peak temperature $T_{Min}$ of the graft polymer (A) are obtained.

Method for Measuring Value (PE/PP) of Ratio of Mole Number of Ethylene Structure (PE) to Mole Number of Propylene Structure (PP) in Polyolefin Segment of Graft Polymer (A) The value (PE/PP) of the ratio of the mole number of the ethylene structure (PE) to the mole number of the propylene structure (PP) in the polyolefin segment of the graft polymer (A) is measured by $^{1}$H-NMR and $^{13}$C-NMR under the following conditions.

Measuring apparatus: FT NMR apparatus JNM-EX400 (manufactured by JEOL Ltd.)

Measurement frequency: 400 MHz ($^{13}$C-NMR: 125 MHz)

Pulse condition: 5.0 μs

Frequency range: 10500 Hz

Cumulative number: 64 times

Measurement temperature: 30° C.

Sample: 50 mg of a measurement sample is put into a sample tube having an inner diameter of 5 mm, heavy chloroform ($CDCl_3$) is added thereto as a solvent, and the sample is dissolved in a constant temperature bath (40° C.), thereby preparing a sample.

From the $^{1}$H-NMR and $^{13}$C-NMR obtained charts, the integration values $S_{PE}$ and $S_{PP}$ of peaks belonging to the ethylene structure (PE) and the propylene structure (PP), which are constitution elements in the polyolefin segment of the graft polymer (A), are calculated.

In addition, the value (PE/PP) of the ratio of the mole number of the ethylene structure (PE) to the mole number of the propylene structure (PP), which are constitution elements in the polyolefin segment, is obtained by calculating each mole number using the integration values $S_{PE}$ and $S_{PP}$ and the number of hydrogen in the belonging constitution element as constitution elements. In addition, for more detailed structural analysis, double quantum filtered $^{1}$H-$^{1}$H shift correlation two-dimensional NMR measurement (DQF-COSY) or the like is performed, and the structures of details are specified from the obtained spectrum.

The structure of polyolefin in the production process of the polyolefin can be specified in the same manner.

Methods for Measuring Acid Value and Weight-average Molecular Weight of Polyolefin Segment of Graft Polymer (A) in Toner The acid value of the polyolefin segment of the graft polymer (A) and the weight-average molecular weight of the polyolefin segment in the toner are calculated using the results of $^{1}$H-NMR, $^{13}$C-NMR, $^{1}$H-NMR, $^{13}$C-NMR and DQF-COSY in the same manner as in the method for calculating the (PE/PP) ratio of the polyolefin segment.

The acid value and weight-average molecular weight of the graft polymer (A) itself isolated or the like by the "method for separating each material from the toner" can be measured by the following neutralization titration and GPC.

Method for Measuring Acid Value of Graft Polymer (A)

The acid value is the number of mg of potassium hydroxide necessary to neutralize an acid that is contained in 1 g of a sample. The acid value of the graft polymer (A) is measured according to JIS K 0070-1992 and specifically measured according to the following procedure.

(1) Preparation of Reagent 1.0 g of phenolphthalein is dissolved in 90 ml of ethyl alcohol (95 vol %), and ion exchange water is added thereto to adjust the volume to 100 ml, thereby obtaining a phenolphthalein solution.

7 g of special-grade potassium hydroxide is dissolved in 5 ml of water, and ethyl alcohol (95 vol %) is added thereto to adjust the volume to 1 L. The solution is put into an alkali-resistant container to prevent the contact with carbon dioxide or the like, left to stand for three days and filtered, thereby obtaining a potassium hydroxide solution. The obtained potassium hydroxide solution is stored in the alkali-resistant container. The factor of the potassium hydroxide solution is obtained from the amount of the potassium hydroxide solution necessary for neutralization when 25 ml of 0.1 mol/L hydrochloric acid is placed in an Erlenmeyer flask, several droplets of the phenolphthalein solution are added thereto, and the hydrochloric acid is titrated with the potassium hydroxide solution. As the 0.1 mol/L hydrochloric acid, hydrochloric acid created according to JIS K 8001-1998 is used.

(2) Operation (A) Main Test 2.0 g of a sample of the graft polymer (A) is precisely weighed in a 200 ml Erlenmeyer flask, 100 ml of a solution mixture of toluene/ethanol (2:1) is added thereto, and the sample is dissolved for five hours. Next, several droplets of the phenolphthalein solution are added thereto as an indicator, and the sample is titrated using the potassium hydroxide solution. The end point of the titration is when the light crimson of the indicator has lasted for 30 seconds.

(B) Blank Test

The same titration as the above-described operation is performed except that the sample is not used (that is, only the solution mixture of toluene/ethanol (2:1) is titrated).

(3) Acid value calculation by assigning the obtained results to the following equation.

$$A=[(C-B)\times f\times 5.61]/S$$

Here, A is the acid value (mgKOH/g), B is the amount (ml) of the potassium hydroxide solution added in the blank test, C is the amount (ml) of the potassium hydroxide solution added in the main test, f is the factor of the potassium hydroxide solution, and S is the mass (g) of the sample.

Measurement of Weight-average Molecular Weight of Graft Polymer (A) by GPC

The weight-average molecular weight (Mw) of an o-dichlorobenzene soluble component (100° C.) of the graft polymer (A) is measured as described below by gel permeation chromatography (GPC). First, a crystalline polyester C is dissolved in o-dichlorobenzene at 100° C. for one hour. In addition, the obtained solution is filtered with a solvent-resistant membrane filter "MYSYORI DISC" (manufactured by Tosoh Corporation) having a pore diameter of 0.2 μm to obtain a sample solution. The sample solution is adjusted so that the concentration of a component soluble in o-dichlorobenzene reaches 0.1 mass %. The weight-average molecular weight is measured using this sample solution under the following conditions.

Device: HLC-8121GPC/HT (manufactured by Tosoh Corporation)

Column: Two TSKgel GMHHR-H HT (7.8 cm I. D×30 cm) (manufactured by Tosoh Corporation)

Detector: RI for high temperatures

Temperature: 135° C.

Solvent: o-Dichlorobenzene

Flow rate: 1.0 mL/min

Sample: 0.4 mL of a 0.1% sample is poured

In the calculation of the molecular weight of the sample, a molecular weight calibration curve created with a monodisperse polystyrene standard sample is used. Furthermore, the molecular weight is calculated by performing polyethylene conversion with a conversion formula that is derived from the Mark-Houwink equation.

In addition, the weight-average molecular weight of polyolefin in the production process is calculated by the same method.

Content of Crystalline Polyester, Content of Release Agent and Content of Graft Polymer (A) in Toner The content of each material can be calculated based on the mass of each material separated by the above-described "method for separating each material from the toner."

Calculation of SP Value of Each Segment of Amorphous Polyester That Is Block Copolymer and SP Value of Styrene Acrylic Polymer Segment of Graft Polymer The SP value of each segment of the amorphous polyester that is a block copolymer and the SP value of the styrene acrylic polymer segment of the graft polymer are obtained as described below according to a calculation method proposed by Fedors.

Regarding an atom or an atomic group in the molecular structure, evaporation energy (Δei) (cal/mol) and molar volume (Δvi) ($cm^3$/mol) are obtained from a table described in "Polym. Eng. Sci., 14(2), 147 to 154 (1974)" and $(\Sigma\Delta ei/\Sigma\Delta vi)^{0.5}$ is regarded as the SP value $(cal/cm^3)^{0.5}$.

The unit of the SP value can be converted according to $1\ (cal/cm^3)^{0.5}=2.045\ (J/cm^3)^{0.5}$.

EXAMPLES

Hereinafter, the present invention will be specifically described with examples, but these do not limit the present invention by any means. The following formulations are mass-based unless particularly otherwise described.

Example 1

Production of Polyolefin a-1

Preparing Catalyst

Production of Metallocene-Carried Catalyst 87.5 ml (0.25 mol in terms of an Al atom) of a toluene solution of methylaluminoxane (concentration: 3 mol/l, trade name: PMAO, manufactured by Tosoh Corporation) and 1.0 mmol of a mixture (meso form content rate: 1 mol %) of chiral dimethylsilylene (2,3,5-trimethylcyclopentadienyl)(2',4',5'-trimethylcyclopentadienyl) zirconium dichloride and dimethylsilylene (2,3,5-trimethylcyclopentadienyl) (2',3',5'-trimethylcyclopentadienyl) zirconium dichloride, which is a meso form thereof, as a crosslinked metallocene compound were injected into a 2000 ml reactor substituted with a nitrogen gas, stirred and held at a temperature of 25° C. for 30 minutes and reacted together, thereby obtaining a reaction product of the metallocene compound and aluminoxane.

Subsequently, 25 g of silica having an average particle diameter of 51 μm fired at a temperature of 750° C. for eight hours in a reduced pressure atmosphere (SYLOPOL® 948, manufactured by Grace Davison) was injected into the reactor, the temperature of the reactor was increased to 100° C., and the reaction product and silica were held for one hour under stirring to perform a contact reaction between the above-obtained reaction product and silica, thereby obtaining a slurry comprising a solid product by which the reaction product was carried.

After the temperature of the reactor was cooled to −10° C., 1000 ml of n-hexane was injected thereinto and stirred for five minutes, the stirring was stopped, and the solvent was separated by decantation.

Subsequently, while the temperature of the reactor was held at −10° C., 1 liter of n-hexane was injected into the reactor and stirred and washed for five minutes, then, the stirrer was stopped, and a washing operation for separating the washed solvent by decantation was repeated, thereby obtaining a solid product by which the reaction product of the metallocene compound and aluminoxane was carried, a metallocene-carried catalyst. Furthermore, 500 ml of n-hexane was injected into the reactor, and the metallocene-carried catalyst was dispersed, thereby producing a slurry.

Creation of Preactivated Catalyst 1000 ml of n-hexane was injected into a stainless steel reactor having an internal capacity of 2000 ml substituted with nitrogen, and the fabricated metallocene-carried catalyst-containing slurry was injected thereinto while the temperature of the reactor was held at 0° C. Next, while the temperature of the reactor was maintained at 0° C., a propylene gas was supplied thereinto at a supply rate of 0.03 mol/minute for 30 minutes and polymerized, thereby carrying the generated propylene homopolymer on the metallocene-carried catalyst.

During this polymerization reaction, the unreacted propylene gas was discharged outside the reactor. After the polymerization time elapsed, the supply of the propylene gas was stopped, subsequently, a gas-phase part of the reactor was substituted with nitrogen while the temperature of the reactor was increased to 25° C., and the solvent was separated by decantation. The obtained preactivated catalyst was washed with n-hexane and dispersed in 1000 ml of toluene in the end, thereby producing a slurry of the preactivated catalyst.

Polymerization of Polyolefin

The polymerization of polyolefin was performed in two stages, and, in the first stage, 500 ml of toluene was charged into a glass autoclave having an internal capacity of 1000 ml sufficiently substituted with nitrogen, and a gas mixture of ethylene (PE) (15 L/hr) and propylene (PP) (5 L/hr) and an oxygen gas (20 ml/hr) were supplied thereto to saturate a liquid phase and a gas phase. After that, 5 ml of the slurry in which the preactivated catalyst had been dispersed and 1.25 mmol of methyl aluminoxane in terms of an aluminum atom were added to the toluene to initiate polymerization. The polymerization was performed at 50° C. for one minute.

Subsequently, as the second stage, the mixing ratio was changed to 18 liters/hr of ethylene and 2 liters/hr of propylene, polymerization was performed for three minutes, and a small amount of isobutanol was then added thereto to stop the polymerization. The obtained polymer solution was added to 1.5 liters of methanol comprising a small amount of hydrochloric acid to precipitate a polyolefin a-1. The precipitated polyolefin a-1 was washed with methanol and dried under reduced pressure.

For the obtained polyolefin a-1, the weight-average molecular weight (Mn) was 1950, and the value (PE/PP) of the ratio of the mole number of the ethylene structure (PE) to the mole number of the propylene structure (PP) was nine, and the acid value was 1.0 mgKOH/g.

Production of Polyolefins a-2 to a-15

A reaction was performed in the same manner except that, in the production example of the polyolefin a-1, the gas ratio and the polymerization time in each of the first stage and the second stage were changed as shown in Table 1, and polyolefins a-2 to a-15 were obtained. The physical properties are shown in Table 2.

TABLE 1

| | First stage | | | | Second stage | | |
|---|---|---|---|---|---|---|---|
| | PE (L/hr) | PP (L/hr) | Oxygen (ml/hr) | Time [min] | PE (L/hr) | PP (L/hr) | Time [min] |
| a-1 | 15 | 5 | 20 | 1 | 18 | 2 | 3 |
| a-2 | 15 | 5 | 10 | 1 | 18 | 2 | 3 |
| a-3 | 15 | 5 | 200 | 1 | 18 | 2 | 3 |
| a-4 | 15 | 5 | 300 | 1 | 18 | 2 | 3 |
| a-5 | 15 | 5 | 300 | 0.5 | 18 | 2 | 1.5 |
| a-6 | 15 | 5 | 300 | 1.5 | 18 | 2 | 4.5 |
| a-7 | 15 | 5 | 300 | 0.8 | 18 | 2 | 2.4 |
| a-8 | 15 | 5 | 300 | 0.8 | 19 | 1 | 2.4 |
| a-9 | 15 | 5 | 300 | 0.8 | 16 | 4 | 2.4 |
| a-10 | 15 | 5 | 300 | 0.8 | 14 | 6 | 2.4 |
| a-11 | 15 | 5 | 0 | 0.8 | 14 | 6 | 2.4 |
| a-12 | 15 | 5 | 450 | 0.8 | 14 | 6 | 2.4 |
| a-13 | 19 | 1 | 0 | 1 | 19.5 | 0.5 | 3 |
| a-14 | 20 | 0 | 0 | 5 | — | — | — |
| a-15 | 0 | 20 | 0 | 25 | — | — | — |

TABLE 2

| | PE/PP ratio | Weight-average molecular weight | Acid value |
|---|---|---|---|
| a-1 | 9 | 1950 | 1.0 |
| a-2 | 9 | 1950 | 0.5 |
| a-3 | 9 | 1950 | 10.0 |
| a-4 | 9 | 1950 | 15.0 |
| a-5 | 9 | 1000 | 15.0 |
| a-6 | 9 | 3000 | 15.0 |
| a-7 | 9 | 800 | 15.0 |
| a-8 | 19 | 800 | 15.0 |
| a-9 | 4 | 800 | 15.0 |
| a-10 | 3 | 800 | 15.0 |
| a-11 | 3 | 800 | 0.0 |
| a-12 | 3 | 800 | 21.0 |
| a-13 | 49 | 1700 | 0 |
| a-14 | — | 2600 | 0 |
| a-15 | — | 12000 | 0 |

The unit of the acid values is mgKOH/g.

Production of Graft Polymer (A) b-1

Polyolefin a-1: 10.0 parts by mass

Xylene: 25.0 parts by mass

The above-listed materials were weighed in a reaction vessel equipped with a cooling tube, a stirrer, a nitrogen introduction tube and a thermocouple. Next, the inside of a flask was substituted with nitrogen and then slowly heated up to a temperature of 175° C. under stirring.

Styrene: 78.0 parts by mass

Butyl acrylate (BA): 8.25 parts by mass

Methacrylic acid (MAA): 3.75 parts by mass

Xylene: 10.0 parts by mass

Di-t-butyl peroxyhexahydroterephthalate: 0.5 parts by mass

After that, the above-listed materials were added dropwise thereto for three hours and, furthermore, stirred for 30 minutes. Next, the solvent was distilled away to obtain a graft polymer (A) b-1.

For the obtained graft polymer (A) b-1, the highest temperature-side exothermic peak temperature $T_{Max}$ measured during lowering temperature of differential scanning calorimetric measurement (DSC) was 68.8° C., the lowest temperature-side exothermic peak temperature $T_{Min}$ was 62.1° C., and $T_{Max}-T_{Min}$ was 6.7° C. In addition, the acid value was 23.7 mgKOH/g. The weight-average molecular weight was 19500. The SP value was 10.55 $[J/cm^3]^{0.5}$.

Production of Graft Polymers (A) b-2 to b-19

A reaction was performed in the same manner except that, in the production example of the graft polymer (A) b-1, the ratio between the kind of the polyolefin and the kind of the styrene/acrylic resin was changed to be as shown in Table 3, and graft polymers (A) b-2 to b-19 were obtained. The physical properties are shown in Table 4.

TABLE 3

| Graft polymer (A) | Polyolefin | Styrene | Butyl acrylate | Stearyl acrylate | Methacrylic acid | Acrylic acid | 2 Hydroxyethyl methacrylate |
|---|---|---|---|---|---|---|---|
| b-1 | a-1 | 78.0 | 8.25 | — | 3.75 | — | — |
| b-2 | a-1 | 78.5 | 7.8 | — | — | 1.7 | 2.0 |
| b-3 | a-1 | 75.99 | 8.25 | — | — | 5.76 | — |
| b-4 | a-1 | 79.5 | 7.8 | — | — | 1.7 | 1.0 |
| b-5 | a-2 | 79.5 | 7.8 | — | — | 1.7 | 1.0 |
| b-6 | a-3 | 79.5 | 7.8 | — | — | 1.7 | 1.0 |
| b-7 | a-4 | 79.5 | 7.8 | — | — | 1.7 | 1.0 |
| b-8 | a-5 | 79.5 | 7.8 | — | — | 1.7 | 1.0 |
| b-9 | a-6 | 79.5 | 7.8 | — | — | 1.7 | 1.0 |
| b-10 | a-7 | 79.5 | 7.8 | — | — | 1.7 | 1.0 |
| b-11 | a-8 | 79.5 | 7.8 | — | — | 1.7 | 1.0 |
| b-12 | a-9 | 79.5 | 7.8 | — | — | 1.7 | 1.0 |
| b-13 | a-10 | 79.5 | 7.8 | — | — | 1.7 | 1.0 |
| b-14 | a-11 | 79.5 | 7.8 | — | — | 1.7 | 1.0 |
| b-15 | a-12 | 79.5 | 7.8 | — | — | 1.7 | 1.0 |
| b-16 | a-13 | 78.0 | 8.25 | — | 3.75 | — | — |
| b-17 | a-14 | 78.0 | 8.25 | — | 3.75 | — | — |
| b-18 | a-15 | 78.0 | 8.25 | — | 3.75 | — | — |
| b-19 | a-1 | 75.1 | — | 12.8 | — | 2.1 | — |

TABLE 4

| Graft polymer (A) | Acid value [mgKOH/g] | $T_{MAX}$ [° C.] | $T_{MIN}$ [° C.] | $T_{MAX}-T_{MIN}$ | Weight-average molecular weight |
|---|---|---|---|---|---|
| b-1 | 23.7 | 68.8 | 62.1 | 6.7 | 19500 |
| b-2 | 15.4 | 70.4 | 62.6 | 7.8 | 20000 |
| b-3 | 41.2 | 66.4 | 60.2 | 6.2 | 32000 |
| b-4 | 10.0 | 71.3 | 65.2 | 6.1 | 18000 |
| b-5 | 10.0 | 71.8 | 66.2 | 5.6 | 20500 |
| b-6 | 11.0 | 67.3 | 58.1 | 9.2 | 21000 |
| b-7 | 11.0 | 64.9 | 51.2 | 13.7 | 23000 |
| b-8 | 11.0 | 62.2 | 48.4 | 13.8 | 16500 |
| b-9 | 11.0 | 69.4 | 56.2 | 13.2 | 38000 |
| b-10 | 11.0 | 59.6 | 47.7 | 11.9 | 13700 |
| b-11 | 11.0 | 57.9 | 48.2 | 9.7 | 14500 |
| b-12 | 11.0 | 62.4 | 53.1 | 9.3 | 22000 |
| b-13 | 11.0 | 64.5 | 56.6 | 7.9 | 27500 |
| b-14 | 10.0 | 64.5 | 58.8 | 5.7 | 18500 |
| b-15 | 11.0 | 62.6 | 43.5 | 19.1 | 32500 |
| b-16 | 23.7 | 68.8 | 67.7 | 1.1 | 17000 |
| b-17 | 23.7 | 66.4 | — | — | 19000 |
| b-18 | 23.7 | — | — | — | 24000 |
| b-19 | 16.0 | 55.9 | 48.1 | 7.8 | 21000 |

Production Example of Amorphous Polyester c-1

Production Example of Segment 1 of Amorphous Polyester c-1

Propylene oxide adduct of bisphenol A (average number of moles added: 2.2 mol): 4.5 parts by mass (34.1 mol %)

Ethylene oxide adduct of bisphenol A (average number of moles added: 2.2 mol): 27.7 parts by mass (22.7 mol %)

Terephthalic acid: 26.5 parts by mass (42.6 mol %)

Fumaric acid: 0.2 parts by mass (0.5 mol %)

The above-listed materials were weighed in a reaction container including a stirring device that was sufficiently heated and dried. 0.5 Parts by mass of tin (II) 2-ethylhexanoate (esterification catalyst) was added to 100 parts by mass of the above-described mixture, the inside of the container was heated to 260° C. while being held in an inert atmosphere by introducing a nitrogen gas thereinto, and a segment 1 of an amorphous polyester c-1 was polymerized. The SP value was 10.8 $[J/cm^3]^{0.5}$.

Production Example of Segment 2 of Amorphous Polyester c-1

Ethylene diol: 20.7 parts by mass (41.2 mol %)

Terephthalic acid: 79.3 parts by mass (58.8 mol %)

The above-listed materials were weighed in a reaction container including a stirring device that was sufficiently heated and dried. 0.5 Parts by mass of tin (II) 2-ethylhexanoate (esterification catalyst) was added to 100 parts by mass of the above-described mixture, the inside of the container was heated to 200° C. while being held in an inert atmosphere by introducing a nitrogen gas thereinto, and a segment 2 of the amorphous polyester c-1 was polymerized. Since the SP value was 12.7 $[J/cm^3]^{0.5}$, the SP difference between the segment 1 and the segment 2 of the amorphous polyester c-1 became 1.9 $[J/cm^3]^{0.5}$.

Segment 1 of amorphous polyester c-1: 89.3 parts by mass (50.0 mol %)

Segment 2 of amorphous polyester c-1: 10.7 parts by mass (50.0 mol %)

The above-listed materials were injected into a reaction vessel equipped with a cooling tube, a stirrer, a nitrogen introduction tube and a thermocouple. In addition, 0.5 parts by mass of tin (II) 2-ethylhexanoate (esterification catalyst) was added as a catalyst to 100 parts by mass of the segments in total. Next, the inside of a flask was substituted with a nitrogen gas and then slowly heated under stirring, and the materials were reacted together for 2.5 hours while being stirred at a temperature of 200° C. Furthermore, the pressure in the reaction vessel was lowered to 8.3 kPa, maintained for one hour and then returned to the atmospheric pressure by cooling the reaction vessel to 180° C. The amorphous polyester c-1 that was a block copolymer was obtained.

Production Example of Amorphous Polyester c-2

Polyoxypropylene (2.2)-2,2-bis(4-hydroxyphenyl)propane: 73.2 parts by mass (56.0 mol %)

Terephthalic acid: 26.6 parts by mass (43.7 mol %)

Trimellitic anhydride: 0.2 parts by mass (0.3 mol %)

Titanium tetrabutoxide (esterification catalyst): 0.5 parts by mass

The above-listed materials were weighed in a reaction vessel equipped with a cooling tube, a stirrer, a nitrogen introduction tube and a thermocouple. Next, the inside of a flask was substituted with a nitrogen gas and then slowly heated under stirring, the materials were reacted together for five hours while being stirred at a temperature of 200° C., and the temperature was lowered after the softening point reaching a temperature of 96° C. was confirmed to stop the reaction, thereby obtaining an amorphous polyester c-2.

Production Example of Crystalline Polyester d-1

Ethylene glycol: 18.2 parts by mass (48.8 mol %)

Tetradecanedioic acid: 71.9 parts by mass (46.3 mol %)

Behenic acid: 10.0 parts by mass (4.9 mol %)

Tin (II) 2-ethylhexanoate (esterification catalyst): 0.5 parts by mass

The above-listed materials were weighed in a reaction vessel equipped with a cooling tube, a stirrer, a nitrogen introduction tube and a thermocouple. Next, the inside of a flask was substituted with a nitrogen gas and then slowly heated under stirring, the materials were reacted together for two hours while being stirred at a temperature of 200° C.

Furthermore, the pressure in the reaction vessel was lowered to 8.3 kPa, the materials were reacted for five hours while the temperature was maintained at 200° C., and the temperature was lowered to stop the reaction, thereby obtaining a crystalline polyester d-1. The melting point was 90° C.

Production Example of Crystalline Polyester d-2

Hexanediol: 35.5 parts by mass (51.8 mol %)

Dodecanedioic acid: 63.8 parts by mass (47.8 mol %)

Behenic acid: 0.7 parts by mass (0.4 mol %)

Tin (II) 2-ethylhexanoate (esterification catalyst): 0.5 parts by mass

The above-listed materials were weighed in a reaction vessel equipped with a cooling tube, a stirrer, a nitrogen introduction tube and a thermocouple. Next, the inside of a flask was substituted with a nitrogen gas and then slowly heated under stirring, the materials were reacted together for two hours while being stirred at a temperature of 200° C.

Furthermore, the pressure in the reaction vessel was lowered to 8.3 kPa, the materials were reacted for five hours while the temperature was maintained at 200° C., and the temperature was lowered to stop the reaction, thereby obtaining a crystalline polyester d-2. The melting point was 68° C.

Production Example of Toner 1

Graft polymer (A) b-1: 5 parts by mass

Amorphous polyester c-1: 100 parts by mass

Crystalline polyester d-1: 10 parts by mass

Release agent W1: 5 parts by mass

Fischer-Tropsch wax (weight-average molecular weight: 500, peak temperature of exothermic peak: 86.6° C.)

Cabon black: 5 parts by mass

The above-listed materials were mixed together using a Henschel mixer (FM-75, manufactured by Mitsui Mining Co., Ltd.) at a rotation speed of 1500 rpm for a rotation time of five minutes and then kneaded with a twin screw kneader (PCM-30 type, manufactured by Ikegai Corp.) set to a temperature of 130° C. The obtained kneaded product was cooled and pulverized to 1 mm or less with a hammer mill to obtain a coarsely pulverized product. The obtained coarsely pulverized product was finely pulverized with a mechanical pulverizer (T-250, manufactured by Turbo Kogyo Co., Ltd.).

Furthermore, classification was performed using FACULTY (F-300, manufactured by Hosokawa Micron Company) to obtain a toner particle 1. Regarding operation conditions, the rotation speed of a classification rotor was set to 11000 rpm, and the rotation speed of the dispersion rotor was set to 7200 rpm. The SP value difference between the styrene acrylic polymer segment of the graft polymer (A) b-1 and the segment 1 of the amorphous polyester c-1 became 0.25 $[J/cm^3]^{0.5}$.

Toner particle 1: 100 parts by mass

Silica fine particle A: Fumed silica surface-treated with hexamethyldisilazane (number-based median diameter (D50) was 120 nm): 4 parts by mass Small particle diameter inorganic fine particle: Titanium oxide fine particle surface-treated with isobutyltrimethoxysilane (number-based median diameter (D50) was 10 nm): 1 part by mass The above-listed materials were mixed together using a Henschel mixer (FM-75, manufactured by Nippon Coke & Engineering Company, Limited) at a rotation speed of 1900 rpm for a rotation time of 10 minutes, and a toner 1 exhibiting negative charging performance was obtained.

Production of Toners 2 to 27

Production was performed in the same manner except that, in the production example of the toner 1, the kinds and rates of the graft polymer A, the release agent, the amorphous polyester and the crystalline polyester were changed to be as shown in Table 5, thereby obtaining toners 2 to 27. In the toners 2 to 27 as well, the amount of amorphous polyester was set to 100 parts by mass. In addition, in the toner 27, the SP value difference between the styrene acrylic polymer segment of b-19 and the segment 1 of the amorphous polyester c-1 became 0.40 $[J/cm^3]^{0.5}$.

As a result of measuring $T_{Max}$, $T_{Min}$, and $T_{Wax}$ by the above-described methods using the obtained toners, the same results as those for the materials used were obtained.

TABLE 5

| Toner | Kind of release agent | Amount of release agent | Kind of graft polymer (A) | Amount of graft polymer (A) | Kind of amorphous polyester | Crystalline polyester | $T_{WAX} - T_{MAX}$ | SP value difference A | SP value difference B |
|---|---|---|---|---|---|---|---|---|---|
| Toner 1 | W1 | 5 | b-1 | 5 | c-1 | d-1 | 17.8 | 0.25 | 1.9 |
| Toner 2 | W1 | 10 | b-1 | 10 | c-2 | d-1 | 17.8 | — | — |
| Toner 3 | W1 | 15 | b-1 | 15 | c-2 | d-1 | 17.8 | — | — |
| Toner 4 | W1 | 1 | b-1 | 1 | c-2 | d-1 | 17.8 | — | — |
| Toner 5 | W1 | 20 | b-1 | 20 | c-2 | d-1 | 17.8 | — | — |
| Toner 6 | W1 | 25 | b-1 | 25 | c-2 | d-1 | 17.8 | — | — |
| Toner 7 | W1 | 25 | b-2 | 25 | c-2 | d-1 | 16.2 | — | — |
| Toner 8 | W1 | 25 | b-3 | 25 | c-2 | d-1 | 20.2 | — | — |
| Toner 9 | W1 | 25 | b-4 | 25 | c-2 | d-1 | 15.3 | — | — |
| Toner 10 | W1 | 25 | b-5 | 25 | c-2 | d-1 | 14.8 | — | — |
| Toner 11 | W1 | 25 | b-6 | 25 | c-2 | d-1 | 19.3 | — | — |
| Toner 12 | W1 | 25 | b-7 | 25 | c-2 | d-1 | 21.7 | — | — |
| Toner 13 | W1 | 25 | b-8 | 25 | c-2 | d-1 | 24.4 | — | — |
| Toner 14 | W1 | 25 | b-9 | 25 | c-2 | d-1 | 17.2 | — | — |
| Toner 15 | W1 | 25 | b-10 | 25 | c-2 | d-1 | 27.0 | — | — |
| Toner 16 | W1 | 25 | b-11 | 25 | c-2 | d-1 | 28.7 | — | — |
| Toner 17 | W1 | 25 | b-12 | 25 | c-2 | d-1 | 24.2 | — | — |

TABLE 5-continued

| Toner | Kind of release agent | Amount of release agent | Kind of graft polymer (A) | Amount of graft polymer (A) | Kind of amorphous polyester | Crystalline polyester | $T_{WAX}-T_{MAX}$ | SP value difference A | SP value difference B |
|---|---|---|---|---|---|---|---|---|---|
| Toner 18 | W1 | 25 | b-13 | 25 | c-2 | d-1 | 22.1 | — | — |
| Toner 19 | W1 | 25 | b-14 | 25 | c-2 | d-1 | 22.1 | — | — |
| Toner 20 | W1 | 25 | b-15 | 25 | c-2 | d-1 | 24.0 | — | — |
| Toner 21 | W2 | 25 | b-13 | 25 | c-2 | d-1 | 10.5 | — | — |
| Toner 22 | W3 | 25 | b-13 | 25 | c-2 | d-1 | 39.2 | — | — |
| Toner 23 | W3 | 25 | b-11 | 25 | c-2 | d-1 | 45.8 | — | — |
| Toner 24 | W1 | 25 | b-16 | 25 | c-2 | d-1 | 17.8 | — | — |
| Toner 25 | W1 | 25 | b-17 | 25 | c-2 | d-1 | 20.2 | — | — |
| Toner 26 | W1 | 25 | b-18 | 25 | c-2 | d-1 | — | — | — |
| Toner 27 | W1 | 25 | b-19 | 25 | c-1 | d-2 | 30.7 | 0.40 | 1.9 |

In the table, as the SP value difference A, the minimum SP value difference of the differences between the SP value of the styrene acrylic polymer segment of the graft polymer (A) and the SP value of the two or more different amorphous polyester segments constituting the block copolymer is shown.

As the SP value difference B, the SP value difference of the two or more different amorphous polyester segments constituting the block copolymer is shown.

In the table, the kinds of the release agents are as described below.

W1: Fischer-Tropsch wax (weight-average molecular weight: 500, peak temperature of exothermic peak: 86.6° C.)

W2: Paraffin wax (weight-average molecular weight: 300, peak temperature of exothermic peak: 75.0° C.)

W3: Fischer-Tropsch wax (weight-average molecular weight: 1000, peak temperature of exothermic peak: 103.7° C.)

Production Example of Magnetic Core

Step 1 (Weighing and Mixing Step)

Ferrite raw materials were weighed so that the contents thereof became as shown below:

$Fe_2O_3$: 61.7 mass %

$MnCO_3$: 34.2 mass %

$Mg(OH)_2$: 3.0 mass %

$SrCO_3$: 1.1 mass %.

After that, the ferrite raw materials were pulverized and mixed together for two hours with a dry ball mill in which zirconia balls (ϕ10 mm) were used.

Step 2 (Prebaking Step)

After the pulverization and mixing, the pulverized ferrite raw materials were baked at 950° C. for two hours in the atmosphere using a burner-type baking furnace to fabricate baked ferrite. The composition of the ferrite is as shown below.

$(MnO)_a(MgO)_b(SrO)_c(Fe_2O_3)_d$

In the formula, a=0.40, b=0.07, c=0.01 and d=0.52

Step 3 (Pulverizing Step)

The prebaked ferrite was pulverized to approximately 0.5 mm with a crusher, 30 parts by mass of water was added to 100 parts by mass of the prebaked ferrite using zirconia balls (ϕ1.0 mm), and the prebaked ferrite was pulverized with a wet ball mill for two hours. After the balls were separated, the prebaked ferrite was pulverized for three hours with a wet bead mill using zirconia beads (ϕ1.0 mm), thereby obtaining a ferrite slurry.

Step 4 (Granulating Step)

2.0 Parts by mass of polyvinyl alcohol with respect to 100 parts by mass of the prebaked ferrite was added to the ferrite slurry as a binder, and the ferrite slurry was granulated to 40 μm spherical particles with a spray dryer (manufacture: Ohkawara Kakohki Co., Ltd.).

Step 5 (Baking Step)

The spherical particles were baked at 1150° C. for four hours under a nitrogen atmosphere (oxygen concentration: 1.0 vol %) in an electric furnace to control the baking atmosphere.

Step 6 (Sorting Step)

The aggregated particles were deagglomerated and sieved with a sieve having an opening of 250 μm to remove coarse particles, thereby obtaining porous magnetic core particles.

Step 7 (Resin Filling Step)

100.0 Parts by mass of the porous magnetic core particles were put into a stirring container of a mixing and stirring device (universal stirrer NDMV manufactured by Dalton Corporation), nitrogen was introduced thereinto while the pressure was lowered to 2.3 kPa with the temperature held at 60° C., and a silicone resin solution was added dropwise thereto so that the content thereof reached 7.5 parts by mass as a resin component with respect to the porous magnetic core particles and continuously stirred for two hours from the end of the dropwise addition.

After that, the temperature was increased up to 70° C. to remove the solvent under reduced pressure, thereby filling the gaps among the porous magnetic core particles with a silicone resin composition that was obtained from the silicone resin solution. After cooling, the obtained filled core particles were moved to a mixer having a spiral blade in a rotatable mixing container (drum mixer UD-AT type manufactured by Sugiyama Heavy Industrial Co. Ltd.) and heated to 220° C. at normal pressure in a nitrogen atmosphere at a rising temperature rate of 2 (° C./min). The filled core particles were heated and stirred at this temperature for 60 minutes to cure the resin. After a thermal treatment, a low magnetic force product was separated by magnetic concentration and classified with a sieve having an opening of 150 μm, thereby obtaining a magnetic core.

Method for Producing Coating Resin

80 Parts by mass of cyclohexyl methacrylate and 20 parts by mass of methyl methacrylate were added to a four-neck flask having a reflux condenser, a thermometer, a nitrogen suction tube and a ground stirring device.

Furthermore, 100 parts by mass of toluene, 100 parts by mass of methyl ethyl ketone and 2.0 parts by mass of azobisisovaleronitrile were added thereto. The obtained mixture was held under a nitrogen flow at 70° C. for 10 hours and repeatedly washed after the end of a polymerization reaction, thereby obtaining a coating resin solution (solid content: 35 mass %).

Production Example of Coating Resin Coating Liquid

Toluene and methyl ethyl ketone were added in a ratio of 1:1 to the coating resin solution so that the resin solid content rate became 5 mass %. The obtained mixture was shaken and stirred for 15 minutes using a paint shaker (manufactured by RADIA), thereby obtaining a coating resin coating liquid.

Production Example of Magnetic Carrier 1

The coating resin coating liquid was injected into a planetary-screw mixer (Nauta mixer VN type manufactured by Hosokawa Micron Company) that had been maintained under reduced pressure (1.5 kPa) at a temperature of 60° C. using the magnetic core so that the solid content reached 3.0 parts by mass with respect to 100 parts by mass of the magnetic core. As an injection method, a third of the resin coating liquid was injected, and solvent removal and an application operation were performed for 20 minutes. Next, another third of the resin coating liquid was injected, solvent removal and an application operation were performed for 20 minutes, another third of the resin coating liquid was injected, and solvent removal and an application operation were performed for 20 minutes.

After that, the obtained mixture was moved to a mixer having a spiral blade in a rotatable mixing container (drum mixer UD-AT type manufactured by Sugiyama Heavy Industrial Co. Ltd.) and thermally treated to a temperature of 120° C. for two hours in a nitrogen atmosphere while being stirred by rotating the mixing container 10 times per minute. A low magnetic force product was removed from the obtained mixture by magnetic concentration, the mixture was passed through a sieve having an opening of 150 μm and classified with a wind classifier, thereby obtaining a magnetic carrier 1.

Production Example of Two-component Developer 1

92.0 Parts of the magnetic carrier 1 and 8.0 parts of the toner 1 were mixed together with a V-type mixer (V-20, manufactured by Seishin Enterprise Co., Ltd.), thereby obtaining a two-component developer 1.

Production Examples of Two-component Developers 2 to 27

The same operation was performed except that, in the production example of two-component developer 1, the materials were changed as shown in Table 6, thereby obtaining two-component developers 2 to 27.

TABLE 6

| | Developer | Toner | Magnetic carrier |
|---|---|---|---|
| Example 1 | Developer 1 | Toner 1 | Magnetic carrier 1 |
| Example 2 | Developer 2 | Toner 2 | Magnetic carrier 1 |
| Example 3 | Developer 3 | Toner 3 | Magnetic carrier 1 |
| Example 4 | Developer 4 | Toner 4 | Magnetic carrier 1 |
| Example 5 | Developer 5 | Toner 5 | Magnetic carrier 1 |
| Example 6 | Developer 6 | Toner 6 | Magnetic carrier 1 |
| Example 7 | Developer 7 | Toner 7 | Magnetic carrier 1 |
| Example 8 | Developer 8 | Toner 8 | Magnetic carrier 1 |
| Example 9 | Developer 9 | Toner 9 | Magnetic carrier 1 |
| Example 10 | Developer 10 | Toner 10 | Magnetic carrier 1 |
| Example 11 | Developer 11 | Toner 11 | Magnetic carrier 1 |
| Example 12 | Developer 12 | Toner 12 | Magnetic carrier 1 |
| Example 13 | Developer 13 | Toner 13 | Magnetic carrier 1 |
| Example 14 | Developer 14 | Toner 14 | Magnetic carrier 1 |
| Example 15 | Developer 15 | Toner 15 | Magnetic carrier 1 |
| Example 16 | Developer 16 | Toner 16 | Magnetic carrier 1 |
| Example 17 | Developer 17 | Toner 17 | Magnetic carrier 1 |
| Example 18 | Developer 18 | Toner 18 | Magnetic carrier 1 |
| Example 19 | Developer 19 | Toner 19 | Magnetic carrier 1 |
| Example 20 | Developer 20 | Toner 20 | Magnetic carrier 1 |
| Example 21 | Developer 21 | Toner 21 | Magnetic carrier 1 |
| Example 22 | Developer 22 | Toner 22 | Magnetic carrier 1 |
| Example 23 | Developer 27 | Toner 27 | Magnetic carrier 1 |

TABLE 6-continued

| | Developer | Toner | Magnetic carrier |
|---|---|---|---|
| Comparative Example 1 | Developer 23 | Toner 23 | Magnetic carrier 1 |
| Comparative Example 2 | Developer 24 | Toner 24 | Magnetic carrier 1 |
| Comparative Example 3 | Developer 25 | Toner 25 | Magnetic carrier 1 |
| Comparative Example 4 | Developer 26 | Toner 26 | Magnetic carrier 1 |

Evaluation

Evaluation was performed using the two-component developer 1.

The two-component developer was put into a developing device for cyan using an image PRESS C810 modified machine for digital commercial printing manufactured by Canon Marketing Japan Inc. as an image-forming apparatus. Regarding the modified points of the apparatus, the apparatus was modified so that the fixation temperature, the process speed, the DC voltage VDC of a developer carrying member, the charging voltage VD of an electrostatic latent image bearing member and the laser power could be freely set.

Particularly, in order to clarify the fact that the two-component developer is capable of exhibiting excellent performance in high-speed printing compared with the related art, evaluation was performed with the process speed set to be high. In addition, regarding image output evaluation, a FFh image (solid image) having a desired image ratio was output, VDC, VD and the laser power were adjusted so that the toner amount laid on the FFh image on paper became as desired, and evaluation to be described below was performed. FFh refers to a value indicating 256 gradations with hexadecimal numbers, 00 h is the first gradation (blank part) of the 256 gradations, and FFh is the $256^{th}$ gradation (solid part) of the 256 gradations.

Bleeding Out Properties of Release Agent on Solid Image

- Paper: CS-064 (64.0 $g/m^2$) (made commercially available by Canon Marketing Japan Inc.)
- Toner amount laid on paper: 1.20 $mg/cm^2$ (adjusted with the DC voltage VDC of the developer carrying member, the charging voltage VD of the electrostatic latent image bearing member and the laser power)
- Evaluation image: A 2 cm×20 cm image was disposed at one long end of the above-described A4 paper in the paper feeding direction with a 2 mm blank from the paper tip.
- Testing environment: High-temperature and high-humidity environment (temperature 30° C./humidity 80% RH (hereinafter, "H/H"))
- Fixation temperature: Increased from 140° C. in increments of 5° C.
- Process speed: 644 mm/sec The evaluation image was output, and the winding resistance was evaluated with the following references at the highest fixation temperature where winding did not occur. Evaluations A to C were determined as favorable.

Evaluation References

- A: 165° C. or higher
- B: 155° C. or higher and lower than 165° C.
- C: 145° C. or higher and lower than 155° C.
- D: Lower than 145° C.

Downflow Properties of Release Agent on Halftone Image

- Paper: CS-064 (64.0 $g/m^2$) (made commercially available by Canon Marketing Japan Inc.)

Toner amount laid on paper: 0.08 mg/$cm^2$ (adjusted with the DC voltage VDC of the developer carrying member, the charging voltage VD of the electrostatic latent image bearing member and the laser power)

Evaluation image: A 2 cm×20 cm image was disposed at one long end of the above-described A4 paper in the paper feeding direction with a 2 mm blank from the paper tip.

Testing environment: Normal-temperature and low-humidity environment (temperature 23° C./humidity 5% RH (hereinafter, "N/L"))

Fixation temperature: Increased from 140° C. in increments of 5° C.

Process speed: 644 mm/sec

The evaluation image was output, and the downflow properties of the release agent on a halftone image were evaluated with the following references at the highest fixation temperature where hot offset did not occur. Evaluations A to C were determined as favorable.

Evaluation References

A: 200° C. or higher

B: 190° C. or higher and lower than 200° C.

C: 180° C. or higher and lower than 190° C.

D: Lower than 180° C.

Scratch Resistance

Paper: image coat gross 158 (158.0 g/$m^2$)

(made commercially available by Canon Marketing Japan Inc.)

Toner amount laid on paper: 0.05 mg/$cm^2$ (2Fh image)

(adjusted with the DC voltage VDC of the developer carrying member, the charging voltage VD of the electrostatic latent image bearing member and the laser power)

Evaluation image: A 3 m×15 cm image was disposed in the center of the above-described A4 paper Testing environment: Normal-temperature and normal-humidity environment (temperature 23° C./humidity 50% RH (hereinafter, "N/N"))

Fixation temperature: 180° C.

Process speed: 644 mm/sec

The evaluation image was output, and the scratch resistance was evaluated. The value of the difference in reflectance was used as the evaluation index of the scratch resistance. First, 0.5 kgf of a load was applied to an image part of the evaluation image using a color fastness rubbing tester (AB-301: manufactured by Tester Sangyo Co., Ltd.) to abrade the image part with new evaluation paper (by 10 times of reciprocating). After that, the reflectance of the part abraded with the new evaluation paper and the reflectance of a part not abraded were measured using a reflectometer (REFLECTOMETER MODEL TC-6DS: manufactured by Tokyo Denshoku. Co., Ltd.).

In addition, the difference in the reflectance before and after the abrasion was calculated using the following equation. The obtained difference in the reflectance was evaluated according to the following evaluation references. Evaluations A to C were determined as favorable.

Difference in reflectance=reflectance before abrasion−reflectance after abrasion Evaluation References A: Less than 1.0%

B: 1.0% or more and less than 2.0%

C: 2.0% or more and less than 4.0%

D: 4.0% or more

Charge Retention

Paper: GFC-081 (81.0 g/$m^2$) (made commercially available by Canon Marketing Japan Inc.)

Toner amount laid on paper: 0.35 mg/$cm^2$ (adjusted with the DC voltage VDC of the developer carrying member, the charging voltage VD of the electrostatic latent image bearing member and the laser power)

Evaluation image: A 2 cm×5 cm image was disposed in the center of the above-described A4 paper Fixation Test environment: High-temperature and high-humidity environment (temperature 30° C./humidity 80% RH (hereinafter, "H/H"))

Process speed: 644 mm/sec

The triboelectric charge quantity of the toner was calculated by suction-collecting the toner on the electrostatic latent image bearing member using a metal cylindrical tube and a cylindrical filter. Specifically, the triboelectric charge quantity of the toner on the electrostatic latent image bearing member was measured with a Faraday Cage. The Faraday cage is a coaxial double tube, and the inner tube and the outer tube are insulated from each other. When a charged member having an amount of electric charge Q is put into the inner tube, electrostatic induction makes the situation as if there is a metal cylinder having an amount of electric charge Q. This induced amount of electric charge was measured with an electrometer (KEITHLEY 6517A manufactured by Keithley Instruments), and a value (Q/M) obtained by dividing the amount of electric charge Q (mC) by the mass M (kg) of the toner in the inner tube was regarded as the triboelectric charge quantity of the toner.

Triboelectric Charge Quantity of Toner (mC/Kg)=Q/M

First, the evaluation image was formed on the electrostatic latent image bearing member, the rotation of the electrostatic latent image bearing member was stopped before the transfer to an intermediate transfer member, the toner on the electrostatic latent image bearing member was suction-collected with a metal cylindrical tube and a cylindrical filter, and [initial Q/M] was measured.

Subsequently, after the developing device put into an evaluation machine in the H/H environment was left to stand for two weeks as it was, the same operation as that before the developing device being left to stand was performed, and the amount of electric charge per unit mass Q/M (mC/kg) on the electrostatic latent image bearing member after being left to stand was measured. The initial Q/M per unit mass on the electrostatic latent image bearing member was regarded as 100%, and the retention rate of Q/M per unit mass on the electrostatic latent image bearing member after being left to stand ([Q/M after being left to stand]/[initial Q/M]×100) was calculated and evaluated with the following evaluation references. Evaluations A to C were determined as favorable.

Evaluation References

A: The retention rate is 95% or more

B: The retention rate is 90% or more and less than 95%

C: The retention rate is 85% or more and less than 90%

D: The retention rate is less than 85%

Dispersibility of Release Agent (F/M)

The endothermic quantities (ΔH) of the maximum endothermic peaks derived from the release agent were measured using the resin particle classified by the classifying step in the production example of the toner 1 and the fine particle-side powder collected separately from the resin particles, respectively.

ΔH of the resin particle was indicated by M, ΔH of the fine particle-side powder was indicated by F, and the dispersibility of the release agent was evaluated with a value (F/M) obtained by F by M. In a case where the release agent is not finely dispersed and is present as a large domain in a kneaded product, the domain acts as a pulverization interface in a pulverization process, and the domain of the release agent is freed from the resin. Since the freed release agent is collected as the fine particle-side powder in the classifying step, when the dispersibility of the release agent is poor, the release agent that has formed the domain is collected to the fine particle-side powder.

Therefore, the dispersibility of the release agent was evaluated by comparing the endothermic quantities (ΔH) of the maximum endothermic peaks derived from the release agent of the resin particle and the fine particle-side powder and determined with the following evaluation references. Evaluations A to C were determined as favorable.

Evaluation References

A: F/M is 1.00 or more and less than 1.05

B: F/M is 1.05 or more and less than 1.10

C: F/M is 1.10 or more and less than 1.20

D: F/M is 1.20 or more

Low-temperature Fixability

The low-temperature fixability was evaluated under the following conditions.

Paper: GFC-081 (81.0 g/m$^2$)

(made commercially available by Canon Marketing Japan Inc.)

Toner amount laid on paper: 0.90 mg/cm$^2$ (adjusted with the DC voltage VDC of the developer carrying member, the charging voltage VD of the electrostatic latent image bearing member and the laser power)

Evaluation image: A 2 cm×5 cm image was disposed in the center of the above-described A4 paper.

Testing environment: Low-temperature and low-humidity environment (temperature 15° C./humidity 10% RH (hereinafter, "L/L"))

Fixation temperature: 140° C.

Process speed: 435 mm/sec

The evaluation image was output, and the low-temperature fixability was evaluated. The value of the image density decrease rate was used as the evaluation index of the low-temperature fixability.

For the image density decrease rate, first, the image density of the central part was measured using an X-Rite color reflection densitometer (500 series: manufactured by X-Rite, Incorporated). Next, a load of 4.9 kPa (50 g/cm$^2$) was applied to the part from which the image density had been measured to abrade the fixed image with lens-cleaning paper (by five times of reciprocating), and the image density was measured again.

In addition, the decrease rate of the image density before and after the abrasion was calculated using the following equation. The obtained decrease rate of the image density was evaluated according to the following evaluation references. Evaluations A to C were determined as favorable.

Decrease rate of image density=(image density before abrasion−image density after abrasion)/(image density before abrasion)×100

Evaluation References

A: The decrease rate of the image density is less than 3.0%

B: The decrease rate of the image density is 3.0% or more and less than 5.0%

C: The decrease rate of the image density is 5.0% or more and less than 8.0%

D: The decrease rate of the image density is 8.0% or more

The evaluation results are shown in Table 7.

Example 2 to Example 22 and Comparative Example 1 to Comparative Example 4

Evaluation was performed in the same manner as in Example 1 except that the two-component developer 2 to the two-component developer 27 were used. The evaluation results are shown in Table 7.

TABLE 7

| | Bleeding out properties of release agent on solid image | | Downflow properties of release agent on halftone image | | Scratch resistance | | Charge retention | | Dispersibility of release agent (F/M) | | Low-temperature fixability | |
|---|---|---|---|---|---|---|---|---|---|---|---|---|
| | [° C.] | Determination | [° C.] | Determination | [° C.] | Determination | [%] | Determination | [F/M] | Determination | [%] | Determination |
| Example 1 | 166 | A | 201 | A | 0.6 | A | 97 | A | 1.04 | A | 2.6 | A |
| Example 2 | 169 | A | 205 | A | 0.8 | A | 95 | A | 1.07 | B | 2.9 | A |
| Example 3 | 173 | A | 208 | A | 0.8 | A | 93 | B | 1.08 | B | 2.9 | A |
| Example 4 | 154 | C | 187 | C | 2.4 | C | 98 | A | 1.02 | A | 2.7 | A |
| Example 5 | 174 | A | 210 | A | 0.7 | A | 90 | B | 1.08 | B | 3.2 | B |
| Example 6 | 170 | A | 213 | A | 0.8 | A | 89 | C | 1.09 | B | 3.1 | B |
| Example 7 | 169 | A | 211 | A | 0.8 | A | 87 | C | 1.07 | B | 3.3 | B |
| Example 8 | 165 | A | 206 | A | 0.7 | A | 98 | A | 1.16 | C | 3.7 | B |
| Example 9 | 171 | A | 207 | A | 0.9 | A | 86 | C | 1.05 | B | 3.4 | B |
| Example 10 | 168 | A | 208 | A | 0.9 | A | 87 | C | 1.06 | B | 3.5 | B |
| Example 11 | 171 | A | 206 | A | 0.9 | A | 88 | C | 1.07 | B | 3.2 | B |
| Example 12 | 175 | A | 205 | A | 0.8 | A | 93 | B | 1.08 | B | 3.3 | B |
| Example 13 | 183 | A | 203 | A | 0.7 | A | 90 | B | 1.12 | C | 3.8 | B |
| Example 14 | 164 | B | 209 | B | 1.4 | B | 94 | B | 1.05 | B | 3.2 | B |
| Example 15 | 181 | A | 201 | A | 0.7 | A | 91 | B | 1.13 | C | 4.5 | B |
| Example 16 | 179 | A | 200 | A | 0.6 | A | 90 | B | 1.11 | C | 4.2 | B |
| Example 17 | 180 | A | 201 | A | 0.7 | A | 92 | B | 1.14 | C | 4.4 | B |
| Example 18 | 174 | A | 194 | B | 1.7 | B | 94 | B | 1.16 | C | 4.3 | B |
| Example 19 | 161 | B | 191 | B | 1.8 | B | 94 | B | 1.12 | C | 4.5 | B |
| Example 20 | 175 | A | 202 | A | 0.7 | A | 94 | B | 1.18 | C | 4.2 | B |
| Example 21 | 162 | B | 195 | B | 1.5 | B | 94 | B | 1.16 | C | 3.9 | B |
| Example 22 | 166 | A | 188 | C | 2.8 | C | 94 | B | 1.19 | C | 4.1 | B |

TABLE 7-continued

| | Bleeding out properties of release agent on solid image | | Downflow properties of release agent on halftone image | | Scratch resistance | | Charge retention | | Dispersibility of release agent (F/M) | | Low-temperature fixability | |
|---|---|---|---|---|---|---|---|---|---|---|---|---|
| | [° C.] | Determination | [° C.] | Determination | [° C.] | Determination | [%] | Determination | [F/M] | Determination | [%] | Determination |
| Example 23 | 166 | A | 193 | B | 1.5 | B | 97 | A | 1.07 | B | 2.6 | A |
| Comparative Example 1 | 169 | A | 177 | D | 6.2 | D | 94 | B | 1.22 | D | 4.8 | B |
| Comparative Example 2 | 143 | D | 192 | B | 1.8 | B | 93 | B | 1.18 | C | 3.4 | B |
| Comparative Example 3 | 144 | D | 178 | D | 5.8 | D | 92 | B | 1.14 | C | 3.6 | B |
| Comparative Example 4 | 141 | D | 174 | D | 6.9 | D | 97 | B | 1.18 | C | 3.8 | B |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-062227, filed Apr. 6, 2023 which is hereby incorporated by reference herein in its entirety.

What is claimed is:

1. A toner comprising:

a toner particle comprising a binder resin, a release agent, and a graft polymer (A), wherein the binder resin comprises an amorphous polyester, the graft polymer (A) has two or more exothermic peaks in an exothermic curve during lowering temperature measured by differential scanning calorimetric measurement, the release agent has at least one exothermic peak in an exothermic curve during lowering temperature measured by differential scanning calorimetric measurement, and when, among exothermic peaks of the graft polymer (A), a peak temperature of a highest temperature-side exothermic peak is indicated by $T_{Max}$ (° C.), a peak temperature of a lowest temperature-side exothermic peak is indicated by $T_{Min}$ (° C.), and, among exothermic peaks of the release agent, a peak temperature of a maximum exothermic peak is indicated by $T_{Wax}$ (° C.), $T_{Max}$, $T_{Min}$ and $T_{Wax}$ satisfy relationships of formulae (1) and (2) below:

$$5.0 \leq T_{Max} - T_{Min} \leq 20.0, \text{ and} \quad (1)$$

$$10.0 \leq T_{Wax} - T_{Max} \leq 40.0. \quad (2)$$

2. The toner according to claim 1, wherein the graft polymer (A) is a graft polymer having a polyolefin segment and a styrene acrylic polymer segment.

3. The toner according to claim 2, wherein the polyolefin segment (i) comprises a copolymer of ethylene and propylene, (ii) has a segment having an acidic group, and (iii) has a value PE/PP of a ratio of a mole number of an ethylene structure PE to a mole number of a propylene structure PP of 4 to 20.

4. The toner according to claim 3, wherein a weight-average molecular weight of the polyolefin segment of the graft polymer (A) is 1000 to 3000.

5. The toner according to claim 3, wherein an acid value of the polyolefin segment is 0.5 to 16.0 mgKOH/g.

6. The toner according to claim 1, wherein an acid value of the graft polymer (A) is 15.0 to 40.0 mgKOH/g.

7. The toner according to claim 1, wherein the toner comprises 3 to 20 parts by mass of a crystalline polyester per 100 parts by mass of the amorphous polyester.

8. The toner according to claim 1, wherein the toner comprises 1 to 20 parts by mass of the release agent and comprises 1 to 20 parts by mass of the graft polymer (A) per 100 parts by mass of the amorphous polyester.

9. The toner according to claim 1, wherein the amorphous polyester is a block copolymer having two or more different amorphous polyester segments, regarding a difference between an SP value of the two or more different amorphous polyester segments constituting the block copolymer and an SP value of a styrene acrylic polymer segment of the graft polymer (A), a minimum SP value difference is 1.00 $[J/cm^3]^{0.5}$ or less, and a SP value difference between the two or more different amorphous polyester segments constituting the block copolymer is 1.0 $[J/cm^3]^{0.5}$ or more.

10. The toner according to claim 1, wherein the release agent comprises a hydrocarbon wax.

11. A two-component developer, comprising a toner and a magnetic carrier, wherein the toner is the toner according to claim 1.

* * * * *